US010214650B2

(12) United States Patent
Yamauchi et al.

(10) Patent No.: US 10,214,650 B2
(45) Date of Patent: Feb. 26, 2019

(54) AQUEOUS COMPOSITE PARTICLE DISPERSION

(71) Applicant: ASAHI KASEI KABUSHIKI KAISHA, Tokyo (JP)

(72) Inventors: Toyoaki Yamauchi, Tokyo (JP); Megumi Sasaki, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 15/110,655

(22) PCT Filed: Jan. 9, 2015

(86) PCT No.: PCT/JP2015/050547
§ 371 (c)(1),
(2) Date: Jul. 8, 2016

(87) PCT Pub. No.: WO2015/105189
PCT Pub. Date: Jul. 16, 2015

(65) Prior Publication Data
US 2016/0333189 A1 Nov. 17, 2016

(30) Foreign Application Priority Data
Jan. 10, 2014 (JP) ................................ 2014-003594

(51) Int. Cl.
*C08K 9/10* (2006.01)
*C08K 3/36* (2006.01)
*C08F 2/24* (2006.01)
*C08F 2/44* (2006.01)
*C08K 3/22* (2006.01)
*C09D 1/00* (2006.01)
*C09D 5/02* (2006.01)
*C09D 7/62* (2018.01)
*C08F 12/08* (2006.01)
*C08F 220/06* (2006.01)
*C08F 220/14* (2006.01)
*C08F 220/18* (2006.01)
*C08F 292/00* (2006.01)
*C09D 133/08* (2006.01)
*C09D 133/12* (2006.01)

(52) U.S. Cl.
CPC .............. *C09D 5/022* (2013.01); *C08F 2/24* (2013.01); *C08F 2/44* (2013.01); *C08F 292/00* (2013.01); *C09D 1/00* (2013.01); *C09D 7/62* (2018.01); *C09D 133/08* (2013.01); *C09D 133/12* (2013.01); *C08K 3/22* (2013.01); *C08K 3/36* (2013.01); *C08K 9/10* (2013.01)

(58) Field of Classification Search
CPC .................... C08K 9/10; C08K 3/36
USPC ........................................ 427/221
See application file for complete search history.

(56) References Cited

U.S. PATENT DOCUMENTS

| 4,724,207 | A | 2/1988 | Hou et al. |
| 5,344,738 | A | 9/1994 | Kmiecik-Lawrynowicz et al. |
| 5,637,644 | A * | 6/1997 | Tsuruoka .............. C08F 236/04 524/828 |
| 5,663,224 | A | 6/1997 | Emmons et al. |
| 5,686,012 | A | 11/1997 | Hayashi et al. |
| 5,856,379 | A | 1/1999 | Shiratsuchi et al. |
| 6,582,761 | B1 | 6/2003 | Nishimoto et al. |
| 6,833,401 | B1 | 12/2004 | Xue et al. |
| 2004/0171728 | A1 | 9/2004 | Xue et al. |
| 2008/0108730 | A1 | 5/2008 | Ben-Moshe et al. |
| 2010/0160491 | A1 | 6/2010 | Armes et al. |
| 2010/0298483 | A1 | 11/2010 | Allen et al. |
| 2010/0298484 | A1 | 11/2010 | Allen et al. |

FOREIGN PATENT DOCUMENTS

| CN | 102533186 A * | 7/2012 | |
| EP | 0 699 721 A2 | 3/1996 | |
| EP | 0 615 535 B1 | 5/1998 | |
| JP | 57-195133 A | 11/1982 | |
| JP | 61-166861 A | 7/1986 | |
| JP | 01280095 A * | 11/1989 | ............ C08F 236/04 |
| JP | 7-502058 A | 3/1995 | |
| JP | 2001-152135 A | 6/2001 | |
| JP | 3278847 B2 | 4/2002 | |
| JP | 3535156 B2 | 6/2004 | |
| JP | 3710363 B2 | 10/2005 | |

(Continued)

OTHER PUBLICATIONS

Machine translated English language equivalent of CN 102533186 (2012, 5 pages).*
CAPlus Abstract of CN 102533186 (AN 2012:976872, 2012, 2 pages).*
Machine translated English language equivalent of JP 01-280095 (1989, 5 pages).*
Human translation of CN 102533186 (2012, 31 pages).*
Supplementaly European Search Report, dated Oct. 14, 2016, for European Application No. 15735045.5.
International Preliminary Report on Patentability and English translation of the Written Opinion of the International Searching Authority (forms PCT/IB/373, PCT/ISA/237 and PCT/IB/338), dated Jul. 21, 2016, for International Application No. PCT/JP2015/050547.

(Continued)

*Primary Examiner* — Brieann R Johnston
(74) *Attorney, Agent, or Firm* — Birch, Stewart, Kolasch & Birch, LLP

(57) ABSTRACT

Disclosed is an aqueous dispersion of composite particles comprising an aqueous medium including water and the composite particles dispersed in the aqueous medium. The composite particle has a particle (A) and a polymer layer (B) with which at least a part of a surface of the particle (A) is encapsulated. The particle (A) is at least any one particle of an inorganic solid particle, or a silica-encapsulated particle having a core particle and a silica layer with which at least a part of the surface of the core particle is encapsulated. The zeta potential of the composite particles in the aqueous dispersion of composite particles at 60° C. is −70 mV to −160 mV at any pH in the range from 7 to 11.

19 Claims, No Drawings

(56) References Cited

FOREIGN PATENT DOCUMENTS

| | | |
|---|---|---|
| JP | 3818689 B2 | 9/2006 |
| JP | WO 2007-190470 A | 8/2007 |
| JP | 4046451 B2 | 2/2008 |
| JP | 4206335 B2 | 1/2009 |
| JP | 4488475 B2 | 6/2010 |
| JP | 2010-527395 A | 8/2010 |
| JP | 2011-213865 A | 10/2011 |
| JP | 2013-522388 A | 6/2013 |
| JP | 2013-522389 A | 6/2013 |
| JP | 2013-213077 A | 10/2013 |
| WO | WO 2007/146418 A2 | 12/2007 |

OTHER PUBLICATIONS

International Search Report (form PCT/ISA/210), dated Mar. 24, 2015, for International Application No. PCT/JP2015/050547.
Yamanaka, et al., "Control of the Surface Charge Density of Colloidal Silica by Sodium Hydroxide in Salt-free and Low-salt Dispersions," Physical Review, vol. 55, No. 3, Mar. 1997, pp. 3028-3036.

\* cited by examiner

AQUEOUS COMPOSITE PARTICLE DISPERSION

TECHNICAL FIELD

The present invention relates to an aqueous dispersion of composite particles comprising an aqueous medium containing water and the composite particles dispersed in the aqueous medium, and a method for producing the same.

BACKGROUND ART

In recent years, an aqueous dispersion has attracted attention as a material for the shift from an organic solvent system to a waterborne system in the coating field. Waterborne paints obtained from a aqueous polymer dispersion, however, has not yet exhibited sufficient physical properties in terms of pigment dispersibility, water resistance, antifouling, hardness and the like, as compared with organic solvent-based paints. The aqueous polymer dispersion here refers to a liquid form in which a polymer is dissolved and/or dispersed in water.

For the purpose of enhancing the function and physical properties of a polymer in water, or for the purpose of enhancing the function of an inorganic solid particle in water, an aqueous dispersion of composite particles in which a polymer and an inorganic solid particle are compounded has been developed.

As the method for producing the aqueous dispersion of composite particles, for example, proposed are an emulsion polymerization method in which a radical polymerizable group is functionalized into a silica particle, a method in which an inorganic solid particle and a polymer are subjected to composite formation by means of a nonionic surfactant having a low clouding point, and an emulsion polymerization method in which the amount of a polymerizable monomer to be fed into a reaction mixture is controlled and composite formation is conducted (Patent Literatures 1 to 4). A method in which a radical polymerizable group is functionalized into a silica particle, the CMC (critical micelle concentration) of an anionic surfactant is determined with respect to the silica particle, the pH is adjusted to 7.5, and a monomer is subjected to emulsion polymerization in a reaction mixture including the silica particle and the anionic surfactant in an amount of CMC or less, however, has the problem of instability during emulsion polymerization and an easy occurrence of an aggregate. In addition, a method in which a radical polymerizable group is not functionalized into a silica particle, the pH is adjusted to 7.5, and a reaction mixture including the silica particle and the anionic surfactant in an amount of CMC or less is used cannot allow a water dispersion to be stably produced (Patent Literature 1).

In the method in which an inorganic solid particle and a polymer is subjected to composite formation by means of a nonionic surfactant having a low clouding point, the inorganic solid particle can be encapsulated every one particle, but it is difficult to stably store a water dispersion for a long period (Patent Literature 2).

In the emulsion polymerization method in which the amount of a monomer to be first fed into a reaction mixture is controlled and composite formation is thus conducted, the polymerization system is adjusted to be neutral or alkaline, and a nonionic surfactant having an ethylene oxide unit, or an alkylarylsulfonic acid is used as a surfactant, but the resulting dispersion is aggregated or polymerization hardly progresses on the surface of an inorganic material, and therefore a particle of a polymer itself is generated separately from an inorganic solid particle. Therefore, as disclosed, a single particle including a plurality of inorganic particles, referred to as a raspberry type, is obtained by emulsion polymerization in which various inorganic solid particles, and a functional monomer and an initiator that are oppositely ionic thereto are combined (Patent Literatures 3 and 4).

Instead of the method in which the amount of a monomer to be first fed into a reaction mixture is controlled, disclosed is a method in which emulsion polymerization is conducted by feeding a monomer into a mixture of an anionic surfactant and water in the presence of a mixture obtained by mixing of a polymer having a sulfonic acid group or a sulfoalkyl group, produced by solution polymerization, and an inorganic solid particle (Patent Literatures 5, 6).

A method is disclosed in which a silane coupling agent having a radical polymerizable group is used to functionalize an inorganic solid particle surface with the radical polymerizable group, and a monomer having a hydroxyl group is used in combination therewith to thereby subject the inorganic solid particle and a polymer to composite formation. But a single particle including a plurality of the inorganic particles is formed or an aggregate is generated in a large amount, while the inorganic particle is encapsulated with a part of the polymer, (Patent Literature 7).

As a method for reducing the zeta potential of an aqueous polymer dispersion, disclosed is a method in which a monomer having an anion group, such as itaconic acid and phosphoric acid ester monomers, is subjected to emulsion polymerization (Patent Literatures 8 and 9).

Furthermore, disclosed is a method in which an inorganic solid particle having a high surface charge density and a polymer are subjected to composite formation (Patent Literature 10). The surface charge density, in which, while the analysis method thereof is not specifically disclosed, the numerical value thereof is 2 to 10 $\mu C/cm^2$, is thus presumed to correspond to σa (analytical surface charge density) described in a common literature (for example, Non Patent Literature 1). In Examples of Patent Literature 10, there is the following description: a dispersion is subjected to dialysis and ion exchange treatments. While no specific description other than this is disclosed in Patent Literature 10, the surface charge density is measured as the numerical value quantitatively determined by electrical conductometric titration after the above treatments and the acid group on the particle surface is merely subjected to quantitative determination. In general, the zeta potential of a particle in a dispersion means the electrical mobility measured in the presence of various impurity ions in the dispersion without any dialysis and ion exchange, and corresponds to the numerical value representing the surface state of the particle under a condition where the dispersion is actually used. Even if electrical conductometric titration is conducted in the same condition, the numerical value determined is in consideration of various ion substances, and even the surface charge density cannot be gained. The composite particle disclosed in Patent Literature 10 achieves a high surface charge density by use of a large amount of an ionic monomer, thereby resulting in production of a particle of a single polymer, in addition to the inorganic solid particle, to cause the problem about warm water resistance of the coating film thereof. Furthermore, as disclosed in Examples, a method in which dispersion polymerization is conducted in the presence of a silica particle in an alcohol is proposed, but the particle cannot be dispersed in water.

CITATION LIST

Patent Literatures

[Patent Literature 1] Japanese Patent No. 3818689
[Patent Literature 2] Japanese Patent No. 404651
[Patent Literature 3] Japanese Patent No. 4206335
[Patent Literature 4] Japanese Patent No. 4488475
[Patent Literature 5] Japanese Unexamined Patent Publication No. 2013-522388
[Patent Literature 6] Japanese Unexamined Patent Publication No. 2013-522389
[Patent Literature 7] Japanese Patent No. 3710363
[Patent Literature 8] Japanese Patent No. 3535156
[Patent Literature 9] Japanese Patent No. 3278847
[Patent Literature 10] International Publication No. WO2007/146418

Non Patent Literature

[Non Patent Literature 1] Physical Review E, 55 (3), 3028 (1997)

SUMMARY OF INVENTION

Technical Problem

According to the method in Patent Literature 5, the zeta potential of the composite particles produced, in the aqueous dispersion, is about −50 mV and the zeta potential is a low absolute value of −50 mV or more even in the polymerization process, thereby causing insufficient encapsulating with the polymer or causing formation of a single particle including a plurality of the inorganic particles, to thereby result in the following problem: warm water resistance of a coating film is not sufficient.

Patent Literatures 8 and 9 describe the following: the monomer having an anion group is copolymerized in a large amount in order to exhibit a low zeta potential, but the method disclosed therein is not particularly different from a usual emulsion polymerization method, no specific emulsion polymerization method is disclosed therein, and the zeta potential is no more than a minimum of about −60 mV in a reproductive experiment by the present inventors. Furthermore, performances of the coating film, such as warm water resistance, are remarkably deteriorated. The following is also disclosed: a low zeta potential is achieved by performing emulsion polymerization in the absence of the inorganic solid particle, but emulsion polymerization in the presence of the inorganic solid particle causes a particle of a single polymer, in addition to the inorganic solid particle, to be easily produced, and also cannot allow the aqueous dispersion to exhibit a low zeta potential.

That is, there has not ever been a method for obtaining a dispersion of composite particles having an inorganic solid particle and a polymer, which is stably dispersed at a low zeta potential, in particular, a method for obtaining an aqueous dispersion including composite particles that is stably dispersed at a low zeta potential, by emulsion polymerization in the presence of an inorganic solid particle.

Then, a main object of the present invention is to provide an aqueous dispersion of composite particles that is excellent in dispersion stability, in particular, that allows a particle including an inorganic solid to be encapsulated with a polymer to thereby be excellent in film formability in drying and also excellent in warm water resistance of a coating film thereof Solution to Problem The present invention relates to the following.

[1] An aqueous dispersion of composite particles comprising: an aqueous medium including water and a composite particle dispersed in the aqueous medium; wherein
the composite particle has a particle (A) and a polymer layer (B) which encapsulates at least a part of a surface of the particle (A); the particle (A) is at least any one particle of an inorganic solid particle, or a silica-encapsulate particle having a core particle and a silica layer which covers encapsulates at least a part of a surface of the core particle; and
a zeta potential of the composite particle in the aqueous dispersion of composite particles at 60° C. is −70 mV to −160 mV at any pH in the range from 7 to 11.

[2] The aqueous dispersion of composite particles according to [1], wherein the polymer layer (B) includes a polymer having an ionic monomer unit derived from an ionic ethylenically unsaturated monomer; and
a content of the ionic monomer unit is 0.01 to 2.5% by mass based on a mass of the polymer.

[3] The aqueous dispersion of composite particles according to [2], wherein the polymer in the polymer layer (B) further has a non-ionic monomer unit derived from a non-ionic ethylenically unsaturated monomer.

[4] The aqueous dispersion of composite particles according to any one of [1] to [3], wherein a zeta potential of the composite particle in the aqueous dispersion of composite particles at 25° C. after being dialyzed is −60 mV to −150 mV at any pH in the range from 7 to 11.

[5] The aqueous dispersion of composite particles according to any one of [1] to [4], wherein a mass ratio of the polymer layer (B)/the particle (A) is 0.01 to 10.

[6] The aqueous dispersion of composite particles according to any one of [1] to [5], wherein
the zeta potential of the composite particles in the aqueous dispersion of composite particles at 60° C. is a value measured with respect to a dispersion for measurement obtained by diluting the aqueous dispersion of composite particles having a pH of 7 to 11 with an aqueous KCl solution; and
when the pH of the aqueous dispersion of composite particles is less than 7, the dispersion for measurement is prepared by adding an aqueous NaOH solution to thereby adjust the pH within the range from 7 to 11 and thereafter diluting the aqueous dispersion of composite particles with an aqueous KCl solution.

[7] The aqueous dispersion of composite particles according to [4], wherein the zeta potential of the composite particles in the aqueous dispersion of composite particles at 25° C. after being dialyzed is a value measured with respect to a dispersion for measurement obtained by dialyzing the aqueous dispersion of composite particles diluted with an aqueous 1 mM NaOH solution and diluting the aqueous dispersion of composite particles having a pH of 7 to 11 after dialysis with an aqueous KCl solution; and
when the pH of the aqueous dispersion of composite particles after being dialyzed is less than 7, the dispersion for measurement is prepared by adding an aqueous NaOH solution to thereby adjust the pH within the range from 7 to 11 and thereafter diluting the aqueous aqueous dispersion of composite particles with an aqueous KCl solution.

[8] The aqueous dispersion of composite particles according to any one of [1] to [7], further comprising two or more surfactants including a surfactant (a) and a surfactant (b).
[9] The aqueous dispersion of composite particles according to [8], wherein the surfactant (a) includes a multi-chain hydrophilic group type compound having two or more hydrophobic groups and at least one hydrophilic group.
[10] The aqueous dispersion of composite particles according to claim 8 or 9, wherein the surfactant (b) includes at least one compound selected from the group consisting of an alkylsulfonate salt, an alkenylsulfonate salt, an alkylarylsulfonate salt, an alkenylarylsulfonate salt, an isethionate salt type alkyl fatty acid ester, an isethionate salt type alkenyl fatty acid ester, an alkyl diphenyl ether disulfonate salt, an alkyl sulfate salt, an alkenyl sulfate salt, an alkylaryl sulfate salt and an ethoxylated alkylphenol sulfate salt.
[11] A method for producing the aqueous dispersion of composite particles according to [2] or [3], comprising:
a step of polymerizing a monomer including the ionic ethylenically unsaturated monomer in a dispersion including water, the particle (A) and a surfactant to form the polymer layer (B) which covers at least a part of a surface of the particle (A).
[12] The method according to [11], wherein
the surfactant includes a surfactant (a) and a surfactant (b); and
the step of forming the polymer layer (B) includes:
  preparing a dispersion including water, the particle (A) and the surfactant (a); and
  polymerizing the monomer after simultaneous or separate addition of the monomer and the surfactant (b) to the dispersion prepared, or with addition of the monomer and the surfactant (b) to the dispersion prepared.
[13] The method according to [12], wherein the surfactant (a) includes a multi-chain hydrophilic group type compound having two or more hydrophobic groups and at least one hydrophilic group.
[14] The method according to [12] or [13], wherein the surfactant (b) includes at least one compound selected from the group consisting of an alkylsulfonate salt, an alkenylsulfonate salt, an alkylarylsulfonate salt, an alkenylarylsulfonate salt, an isethionate salt type alkyl fatty acid ester, an isethionate salt type alkenyl fatty acid ester, an alkyl diphenyl ether disulfonate salt, an alkyl sulfate salt, an alkenyl sulfate salt, an alkylaryl sulfate salt and an ethoxylated alkylphenol sulfate salt.
[15] The method according to any one of [12] to [14], wherein a content of the surfactant (a) in the dispersion is 0.05 to 25% by mass based on a total amount of 100% by mass of the monomer, and an amount of the surfactant (b) to be added to the dispersion is 0.01 to 10% by mass based on a total amount of 100% by mass of the monomer.
[16] The method according to any one of [11] to [15], wherein the dispersion further includes a water-soluble initiator;
the monomer is polymerized by emulsion polymerization; and a content of the water-soluble initiator in the dispersion is 0.01 to 1.0% by mass based on a total amount of 100% by mass of the monomer.
[17] The method according to any one of [11] to [16], wherein the dispersion further includes an oil-soluble initiator;
the monomer is polymerized by emulsion polymerization or miniemulsion polymerization; and
a content of the oil-soluble initiator in the dispersion is 0.01 to 0.1% by mass based on a total amount of 100% by mass of the monomer.

[18] The method according to any one of [11] to [17], wherein, while a mass ratio of the polymer layer (B)/the particle (A) is in the range from 0.01 to 0.5 in a process of polymerizing the monomer, the zeta potential of the composite particles in the dispersion at 60° C. is −70 mV to −160 mV at any pH in the range from 7 to 11.
[19] The method according to any one of [11] to [18], wherein, while a mass ratio of the polymer layer (B)/the particle (A) is in the range from 0.01 to 0.5 in a process of polymerizing the monomer, the polymer layer (B) includes 0.01 to 2.5% by mass of an ionic monomer unit derived from the ionic ethylenically unsaturated monomer based on a mass of 100% by mass of the polymer in the polymer layer (B).

Advantageous Effects of Invention

According to the present invention, provided is an aqueous dispersion of composite particles that is excellent in dispersion stability and that allows a particle including an inorganic solid to be encapsulated with a polymer to thereby have good film formability in drying and enable a coating film excellent in warm water resistance to be formed.

DESCRIPTION OF EMBODIMENTS

Hereinafter, a suitable embodiment of the present invention is described in detail. The present invention, however, is not limited to the following embodiment.
<Composite Particle>
A composite particle according to the present embodiment includes a particle (A) including an inorganic solid and a polymer layer (B) which encapsulates at least a part of the surface of the particle (A).
In a dispersion comprising an aqueous medium including water and the composite particles dispersed in the aqueous medium, the zeta potential of the composite particles at 60° C. is −70 mV to −160 mV, more preferably −75 mV to −150 mV at any pH in the range from 7 to 11. This zeta potential is preferably −70 mV to −160 mV at any pH in the range from 8 to 10.5, further preferably −75 mV to −150 mV at any pH in the range from 8 to 10.5, particularly preferably −80 mV to −150 mV at any pH in the range from 8 to 10.5. The composite particle according to the present embodiment may be an anion type or amphoteric ion type particle.
In the dispersion (emulsion) comprising the composite particles according to the present embodiment, the mass ratio of the polymer layer (B)/the particle (A) (mass ratio of the polymer layer (B) to the particle (A)) is, for example, 0.01 to 100, preferably 0.025 to 20, further preferably 0.01 to 10 or 0.05 to 10. Preferably, in these mass ratio ranges, the zeta potential of the composite particles in the aqueous dispersion of composite particles at 60° C. is −70 mV to −160 mV at any pH in the range from 7 to 11.
The composite particle according to the present embodiment can have various structures. The particle (A) constituting the composite particle according to the present embodiment may be at least one fine inorganic solid particle, or may be a core-shell type silica-encapsulated particle having a core particle and a silica layer with which at least a part of the surface of the core particle is encapsulated.
The particle (A) may also be fully covered with the polymer layer (B). The dispersion may also comprise, in addition to the particle (A) encapsulated with the polymer layer (B), a particle (A) arranged on the surface of a polymer particle. Most of the particle (A) can also be arranged on the surface of a polymer particle. In individual cases, partial aggregation of the composites particle may slightly occur depending on the solid substance concentration of the composite particles dispersed in water, and the composite particles in the present embodiment can also be in such a state. The dispersion of the present embodiment may also include a particle (A) not encapsulated with the polymer layer (B), in addition to the composite particle in which each particle (A) is dispersed in the state of being encapsulated with the polymer layer (B). Here, it is possible to easily exhibit the zeta potential of the composite particles in the aqueous dispersion of composite particles at a low value. It is preferable that the particle (A) be fully covered with the polymer layer (B), and it is further preferable that every unit of the particle (A) be fully encapsulated with the polymer layer (B). Such a full encapsulating shape can be presumed from the following: a counter ion condensation phenomenon unique to a silanol group on the particle surface is not observed by electrical conductometric titration after dialysis and ion exchange of the dispersion. In addition, encapsulating of every particle unit can be confirmed from particle size measurement.

<Particle (A)>

The particle size (average particle size) of the particle (A) is preferably 1 nm to 5 μm, further preferably 1 nm to 500 nm, particularly preferably 3 nm to 250 nm in terms of transparency of a coating film to be formed from the composite particles. The average particle size of the particle (A) can be determined by a dynamic light scattering method using ELSZ-1000ZS manufactured by Otsuka Electronics Co., Ltd. and the like based on a cumulant method analysis.

Inorganic Solid Particle

The inorganic solid particle that can be used is, for example, suitably a metal particle, and a particle of a metal compound, a metalloid compound or a nonmetal inorganic compound. The metal compound is selected from, for example, a metal oxide and a metal salt. The inorganic solid particle may also be a particle configured from a single phase including an inorganic material.

A fine metal particle may be noble metal colloid, for example, colloid of palladium, silver, ruthenium, platinum, gold, rhodium or an alloy containing these metals.

The metal oxide particle includes a metal oxide selected from, for example, titanium dioxide (titania, produced by Ishihara Sangyo Kaisha Ltd., for example), zirconium oxide (zirconia), tin oxide (produced by Nissan Chemical Industries. Ltd., for example), aluminum oxide (produced by Nissan Chemical Industries. Ltd., for example), barium oxide, magnesium oxide, various iron oxides (for example, wuestite, hematite and magnetite), chromium oxide, antimony oxide, bismuth oxide, zinc oxide, nickel oxide, cobalt oxide, copper oxide, yttrium oxide and cerium oxide. The metal oxide may be amorphous, or various crystal modifications. The metal oxide particle may include a metal compound selected from hydroxy oxides of metals, such as hydroxytitanium oxide, hydroxyzirconium oxide, hydroxyaluminum oxide and hydroxyiron oxide, and these may be amorphous, or various crystal modifications.

A particle of any metal salt described below, present as being amorphous and/or various crystal structures, can be used as the inorganic solid particle in the present embodiment:

sulfides such as iron sulfide, iron disulfide, tin sulfide, mercury sulfide, cadmium sulfide, zinc sulfide, copper sulfide, silver sulfide, nickel sulfide, cobalt sulfide, manganese sulfide, chromium sulfide, titanium sulfide, titanium sulfide, zirconium sulfide, antimony sulfide and bismuth sulfide;

hydroxides such as tin hydroxide, aluminum hydroxide, magnesium hydroxide, calcium hydroxide, barium hydroxide, zinc hydroxide and iron hydroxide;

sulfates such as calcium sulfate, strontium sulfate, barium sulfate and lead sulfate;

carbonates such as lithium carbonate, magnesium carbonate, calcium carbonate, zinc carbonate, zirconium carbonate and iron carbonate; orthophosphates such as lithium orthophosphate, calcium orthophosphate, zinc orthophosphate, magnesium orthophosphate, aluminum orthophosphate, tin orthophosphate and iron orthophosphate; metaphosphates such as lithium metaphosphate, calcium metaphosphate and aluminum metaphosphate;

pyrophosphates such as magnesium pyrophosphate, calcium pyrophosphate, zinc pyrophosphate, iron pyrophosphate and tin pyrophosphate;

ammonium phosphates such as ammonium magnesium phosphate, ammonium zinc phosphate and hydroxyl apatite;

orthosilicates such as lithium orthosilicate, calcium/magnesium orthosilicate, aluminum orthosilicate, iron orthosilicate, magnesium orthosilicate, zinc orthosilicate and zirconium orthosilicate; metasilicates such as lithium metasilicate, calcium/magnesium metasilicate, calcium metasilicate, magnesium metasilicate and zinc metasilicate;

layered silicates such as aluminum sodium silicate and magnesium sodium silicate, in particular, forms spontaneously delaminated, for example, Oprigel (registered trademark) (produced by Rockwood Lithium), Saponite (registered trademark), Hektorite (registered trademark) (produced by Hoechst AG) and Laponite (registered trademark) (produced by Rockwood Lithium);

aluminates such as lithium aluminate, calcium aluminate and zinc aluminate;

borates such as magnesium metaborate and magnesium orthoborate;

oxalic acids such as calcium oxalate, zirconium oxalate, zinc oxalate and aluminum oxalate;

tartrates such as calcium tartrate, acetylacetonate, aluminum acetylacetonate and iron acetylacetonate;

salicylates such as aluminum salicylate;

citrates such as calcium citrate, iron citrate and zinc citrate;

palmitates such as aluminum palmitate, calcium palmitate and magnesium palmitate;

stearates such as aluminum stearate, calcium stearate, magnesium stearate and zinc stearate;

laurates such as calcium laurate;

linolenates such as calcium linolenate; and oleates such as iron oleate and zinc oleate.

Examples of the metalloid compound particle that can be used as the inorganic solid particle in the present embodiment include a silicon dioxide (silica) particle that is present as being amorphous and/or various crystal structures. A suitable silicon dioxide (silica) particle is commercially available, and is available as, for example, Aerosil (registered trademark) (produced by Evonik), Levasil (registered trademark) (produced by Bayer Holding Ltd.), Ludox (registered trademark) (produced by Du Pont), Nyacol (registered trademark) (produced by Nyacol Nano Technologies, Inc.), Bindzil (registered trademark) (produced by Akzo Nobel), Snowtex (registered trademark) (produced by Nissan Chemical Industries. Ltd.), Adelite (registered trademark) (produced by Adeka Corporation) and Cataloid (registered trademark) (trademark of JGC C&C.).

A suitable nonmetal compound particle is, for example, graphite and diamond that are present in the form of colloid.

The inorganic solid particle in the present embodiment preferably includes at least one inorganic compound selected from the group consisting of silicon dioxide, aluminum oxide, tin oxide, yttrium oxide, cerium oxide, hydroxy aluminum oxide, calcium carbonate, magnesium carbonate, calcium orthophosphate, magnesium orthophosphate, calcium metaphosphate, magnesium metaphosphate, calcium pyrophosphate, magnesium pyrophosphate, iron oxide, titanium dioxide, hydroxy apatite, zinc oxide and zinc sulfide. A colloidal silica exhibiting a zeta potential having a negative sign is further preferable.

Silica-encapsulated Particle

The silica-encapsulated particle has a core particle and a silica layer which encapsulates a part or the whole of the surface of the core particle and includes silicon dioxide (silica). The silica-encapsulated particle can be obtained by, for example, a method of subjecting at least one silane compound to hydrolysis and a condensation reaction in the presence of the core particle dispersed in an aqueous medium or an organic solvent. Surfactant(s) can be appropriately used, if necessary.

The silica-encapsulated particle can have substantially the same surface as a silica particle surface. The silica layer may be fully encapsulated with the polymer layer (B).

The core particle may be an inorganic solid particle or an organic polymer particle. While a particle itself having an inorganic solid particle as the core particle and the silica layer can correspond to an inorganic solid particle, it is classified into the silica-encapsulated particle herein. The inorganic solid particle as the core particle can be selected from the above-exemplified inorganic solid particles.

The polymer particle as the core particle can include a polymer selected from the group consisting of, for example, a vinyl polymer, a vinyl acetate polymer, polyether, polyester, polycarbonate, polyamide, polyurethane, a diene type polymer, a melamine/benzoguanamine type polymer, an aromatic polymer, polyimide, polycarbonate, polyurethane, polycaprolactone, a sulfur type polymer and a natural polymer. It is preferable that the polymer particle be a particle including at least one polymer selected from an acrylic polymer including a (meth)acrylic acid ester as a monomer unit, a styrene-acrylic polymer including styrene and a (meth)acrylic acid ester as monomer units, a styrene-butadiene polymer including styrene and butadiene as monomer units, and a silicone-modified polymer.

It is preferable that the silane compound to be used for forming the silica layer include at least one selected from a compound represented by the following formula (a).

$(R^1)_n$—Si—$(R^2)_{4-n}$ (a)

In the formula, n is an integer of 0 to 3, $R^1$ is a hydrogen atom, an aliphatic hydrocarbon group having 1 to 16 carbon atoms, an aryl group having 5 to 10 carbon atoms, a cycloalkyl group having 5 to 6 carbon atoms, a vinyl group, an alkyl acrylate group having 1 to 10 carbon atoms, or an alkyl methacrylate group having 1 to 10 carbon atoms, n of $R^1$(s) may be the same or different, $R^2$ is an alkoxy group having 1 to 8 carbon atoms, an acetoxy group or a hydroxyl group, and 4–n of $R^2$(s) may be the same or different.

In particular, it is preferable that the silane compound include at least one of a silane compound (I) where n in the formula (a) is 0 or a silane compound (II) where n in the formula (a) is 1, and it is further preferable that the silane compound be a silane compound (I) where n is 0 in order to allow the water dispersion to achieve good polymerization stability and crosslinking effect.

It is preferable that each $R^2$ in the silane compound (I) independently is a methoxy group, an ethoxy group, a propoxy group, a butoxy group, a methoxyethoxy group or a hydroxyl group. Preferable specific examples of the silane compound (I) include tetramethoxysilane and tetraethoxysilane.

It is preferable that $R^1$ in the silane compound (II) is a methyl group, a phenyl group, a cyclohexyl group, a vinyl group or a γ-(meth)acryloxypropyl group. It is preferable that each $R^2$ in the silane compound (II) independently is a methoxy group, an ethoxy group, a propoxy group, a butoxy group, a methoxyethoxy group or a hydroxyl group. Preferable specific examples of the silane compound (II) include methyltrimethoxysilane, phenyltrimethoxysilane, methyltriethoxysilane, phenyltriethoxysilane, cyclohexyltrimethoxysilane and isobutyltrimethoxysilane. Examples of a silane compound (II) having a radical polymerizable double bond includes vinylethoxysilane, γ-acryloxypropyltrimethoxysilane, γ-acryloxypropyltriethoxysilane, γ-methacryloxypropyltrimethoxysilane and γ-methacryloxypropyltriethoxysilane.

These silane compounds can be used singly or in combinations of two or more. Preferably, a hydrolyzable silane compound having a radical polymerizable double bond and a silane compound not having a radical polymerizable double bond can be used in combination. Oligomers of such a silane compound can also be used.

The proportion of the silica layer in the silica-covered particle may be, for example, 0.1 to 100% by mass relative to the mass of the silica-encapsulated particle.

<Polymer Layer (B)>

Ionic Ethylenically Unsaturated Monomer

In order to keep the zeta potential of the composite particles in the dispersion low in the polymerization process for forming the polymer layer (B), an ionic ethylenically unsaturated monomer having an anionic terminal group is preferably used as a monomer, although it may not be used. In other words, it is preferable that the polymer layer (B) have an ionic monomer unit derived from an ionic ethylenically unsaturated monomer. Specifically, for example, an ionic ethylenically unsaturated monomer having at least one group selected from the group consisting of a carboxylic acid group, a phosphoric acid group, a sulfonic acid group and a sulfate ester group can be used.

Examples of the ionic ethylenically unsaturated monomer having a carboxylic acid group include itaconic acid, fumaric acid, maleic acid, maleic anhydride, maleic acid and monoesters thereof, and acrylic acid, methacrylic acid and crotonic acid.

The ionic ethylenically unsaturated monomer having a phosphoric acid group is selected from, for example, dihydrogen phosphate esters of alcohols also including a polymerizable vinyl or olefin group (e.g., mono- or diphosphates of allyl phosphate, bis(hydroxymethyl)fumarate or itaconate), and derivatives of (meth)acrylic acid esters (e.g., phosphates of hydroxyalkyl (meth)acrylates, phosphate monoesters of 2-hydroxyethyl (meth)acrylate, phosphate monoesters of 2-hydroxypropyl (meth)acrylate, and phosphate monoesters of 3-hydroxypropyl (meth)acrylate). Examples of other monomer having a phosphoric acid group include vinylphosphonic acid, allylphosphonic acid, 2-acrylamide-2-methylpropanephosphonic acid, α-phosphonostyrene, 2-methylacrylamide-2-methylpropanephosphonic acid, phosphate diesters of 2-hydroxyethyl (meth)acrylate, phosphate diesters of 2hydroxypropyl (meth)acrylate, phosphate diesters of 3hydroxypropyl (meth)acrylate, SIPOMER (trademark) PAM-100, SIPOMER (trademark) PAM-200, SIPOMER (trademark) PAM-300 and SIPOMER (trademark) PAM-400 that are available from Rhodia, Incorporated (Rhodia, Inc.), and Phosmer (trademark) PE, Phosmer (trademark) PP and Phosmer (trademark) CL that are available from Uni-Chemical Co., Ltd.

Examples of the ionic ethylenically unsaturated monomer having a sulfonic acid group or a sulfate ester group include α-olefinsulfonic acids including allylsulfonic acid, p-styrenesulfonic acid, 2-acrylamide-2-methylpropanesulfonic acid, and 3-allyloxy-2-hydroxy-1-propanesulfonic acid. Salts of these acids (for example, alkali metal salt and ammonium salt) can also be encompassed in the "ionic ethylenically unsaturated monomer having a sulfonic acid group or a sulfate ester group". Examples of the alkali metal salt or the ammonium salt include a lithium salt, a sodium salt, a potassium salt, an ammonium salt, an alkanol ammonium salt, and an ammonium salt of basic amino acid.

The amount of the ionic ethylenically unsaturated monomer having an anionic terminal group, to be used, is usually 5% by mass or less, preferably 0.01 to 2.5% by mass, further preferably 0.01 to 2.0% by mass based on the total amount of the polymerizable monomer. In the case where the amount of the ionic ethylenically unsaturated monomer to be used is more than 5% by mass, water resistance of the resulting coating film tends to be deteriorated.

Ethylenically Unsaturated Monomer

The monomer to be used for forming the polymer layer (B) may include a monomer different from the ionic ethylenic monomer, such as one or more non-ionic ethylenically unsaturated monomers. Examples of the non-ionic ethylenically unsaturated monomer include acrylic acid esters, methacrylic acid esters and monomers copolymerizable therewith. Herein, acrylic acid and methacrylic acid may be collectively designated as "(meth)acrylic acid". The monomers copolymerizable with (meth)acrylic acid esters are not particularly limited, and specific examples thereof include a methacrylamide type monomer, vinyl cyanides, and an ethylenically unsaturated monomer having an aldo group or a keto group.

Examples of the (meth)acrylic acid esters include (meth)acrylic acid alkyl esters in which the alkyl moiety has 1 to 18 carbon atoms, (meth)acrylic acid hydroxyalkyl esters in which the alkyl moiety has 1 to 18 carbon atoms, (poly)oxyethylene (meth)acrylates each having 1 to 100 oxyethylene groups, (poly)oxypropylene (meth)acrylates having 1 to 100 oxypropylene groups, and (poly)oxyethylene di(meth)acrylates having 1 to 100 oxyethylene groups.

Specific examples of the (meth)acrylic acid alkyl esters include methyl (meth)acrylate, ethyl (meth)acrylate, n-butyl (meth)acrylate, 2-ethylhexyl (meth)acrylate, cyclohexyl (meth)acrylate, methylcyclohexyl (meth)acrylate, dodecyl (meth)acrylate, isobornyl (meth)acrylate, stearyl (meth)acrylate and adamantyl (meth)acrylate.

Specific examples of the (meth)acrylic acid hydroxyalkyl esters include 2-hydroxyethyl (meth)acrylate, 2-hydroxypropyl (meth)acrylate, 2-hydroxycyclohexyl (meth)acrylate and dodecyl (meth)acrylate.

Specific examples of the (poly)oxyethylene (meth)acrylates include ethylene glycol (meth)acrylate, ethylene glycol methoxy(meth)acrylate, diethylene glycol (meth)acrylate, diethylene glycol methoxy(meth)acrylate, tetraethylene glycol (meth)acrylate and tetraethylene glycol methoxy(meth)acrylate.

Specific examples of the (poly)oxypropylene (meth)acrylates include propylene glycol (meth)acrylate, propylene glycol methoxy(meth)acrylate, dipropylene glycol (meth)acrylate, dipropylene glycol methoxy(meth)acrylate, tetrapropylene glycol (meth)acrylate and tetrapropylene glycol methoxy(meth)acrylate.

Specific examples of the (poly)oxyethylene di(meth)acrylates include ethylene glycol di(meth)acrylate, diethylene glycol di(meth)acrylate, diethylene glycol methoxy(meth)acrylate and tetraethylene glycol di(meth)acrylate.

Examples of the (meth)acrylamide type monomers include (meth)acrylamide, N-methylol (meth)acrylamide, N-butoxymethyl (meth)acrylamide, dimethyl (meth)acrylamide, diethyl (meth)acrylamide, vinylpyrrolidone and diacetone (meth)acrylamide. Examples of vinyl cyanides include (meth)acrylonitrile and N,N'-methylenebisacrylamide.

Examples of the ethylenically unsaturated monomer having an aldo group or a keto group include acrolein, diacetone acrylamide, diacetone methacrylamide, vinyl methyl ketone, vinyl ethyl ketone, acetoacetoxyethyl methacrylate, acetoacetoxyethyl acrylate, formylstyrol, and combinations thereof.

Specific examples of an ethylenically unsaturated monomer other than the above, which can be used for formation of the polymer layer (B), include olefins such as ethylene, propylene and isobutylene; dienes such as butadiene; haloolefins such as vinyl chloride and vinylidene chloride; carboxylic acid vinyl esters such as vinyl acetate, vinyl propionate, vinyl n-butyrate, vinyl benzoate, vinyl p-t-butylbenzoate, vinyl pivalate, vinyl 2-ethylhexanoate, vinyl versatate and vinyl laurate; carboxylic acid isopropenyl esters such as isopropenyl acetate and isopropenyl propionate; vinyl ethers such as ethyl vinyl ether, isobutyl vinyl ether and cyclohexyl vinyl ether; aromatic vinyl compounds such as styrene and vinyl toluene; allyl esters such as allyl acetate and allyl benzoate; allyl ethyl ether; and allyl ethers such as allyl glycidyl ether and allyl phenyl ether.

Examples of still other ethylenically unsaturated monomer include γ-(meth)acryloxypropyltrimethoxysilane, vinylmethyldiethoxysilane, vinylmethyldimethoxysilane, vinyldimethylethoxysilane, vinyldimethylmethoxysilane, vinyltrimethoxysilane, vinyltriethoxysilane, 4-(meth)acryloyloxy-2,2,6,6,-tetramethylpiperidine, 4-(meth)acryloyloxy-1,2,2,6,6,-pentamethylpiperidine, perfluoromethyl (meth)acrylate, perfluoropropyl (meth)acrylate, perfluoropropylmethyl (meth)acrylate, vinylpyrrolidone, trimethylolpropane tri(meth)acrylate, 2,3-cyclohexene oxide (meth)acrylate, allyl (meth)acrylate, divinylbenzene, and combinations thereof.

<Method for Producing Aqueous Dispersion of Composite Particles>

The method for producing the aqueous dispersion of composite particles includes, for example, a step of polymerizing the monomer (ethylenically unsaturated monomer) in a dispersion including water, the particle (A) and a surfactant to form the polymer layer (B) which encapsulates at least a part of the surface of the particle (A). Preferably, a predetermined amount of a surfactant is mixed with a dispersion including water and the particle (A), and thereafter the monomer is added to the dispersion. The method for feeding the monomer is not particularly limited, and the monomer is stepwise or continuously fed to the reaction system and the feeding rate is determined within a range that can allow heat of the reaction system to be removed.

A low zeta potential of the composite particles in the final aqueous dispersion of composite particles can be achieved by maintaining a low zeta potential in the polymerization process. Specifically, while the mass ratio of the polymer layer (B)/the particle (A) in the polymerization process is in the range from 0.01 to 0.5, the zeta potential of the composite particles in the dispersion at 60° C. is preferably −70 mV to −160 mV at any pH in the range from 7 to 11, further preferably −80 mV to −160 mV at any pH in the range from 7 to 11, particularly preferably −85 mV to −160 mV at any pH in the range from 7 to 11. The aqueous dispersion of composite particles can be obtained with almost no occurrence of aggregation by maintaining a low zeta potential in the polymerization process.

In order to maintain such a zeta potential (negative charge) in the polymerization process, adjusting of the combination of the types of the surfactant and the used amount thereof to be used, adjusting of the type of the ionic ethylenically unsaturated monomer having an anionic terminal group and the amount thereof to be used, adjusting of the amount of persulfate of a water-soluble initiator to be used, maintaining of the pH of the dispersion in polymerization at 7 or more, and any combination thereof can be applied. The pH of the dispersion in polymerization is more preferably maintained at 7.6 or more, further preferably at 8 or more. As a result, the final zeta potential of the aqueous dispersion of composite particles can be determined.

More particularly, it is preferable that, while the mass ratio of the polymer layer (B)/the particle (A) in the polymerization process is in the range from 0.01 to 0.5, the pH of the dispersion be 7 or more and the zeta potential of the composite particles in the dispersion at 60° C. be −70 mV to −160 mV at any pH in the range from 7 to 11. It is more preferable that, while the mass ratio of the polymer layer (B)/the particle (A) in the polymerization process is in the range from 0.01 to 0.5, the pH of the dispersion be 8 or more and the zeta potential of the composite particles in the dispersion be −80 mV to −160 mV at any pH in the range from 8 to 11. It is particularly preferable that, while the mass ratio of the polymer layer (B)/the particle (A) in the polymerization process is in the range from 0.01 to 0.5, the pH of the dispersion be 8 or more and the zeta potential of the composites particle in the dispersion be −85 mV to −160 mV at any pH in the range from 8 to 11.

The pH of the dispersion is preferably adjusted at 7.6 or more, more preferably 8 or more, further preferably 9 or more for dispersion stability of the particle (A) at the initial stage of polymerization (before initiation of polymerization) where the particle (A) is dispersed in water. If the pH of the dispersion is less than 7.6, dispersion stability can be insufficient to cause the particle to be partially aggregated in the polymerization process after feeding of the monomer.

While the mass ratio of the polymer layer (B)/the particle (A) is in the range from 0.01 to 0.5 in the polymerization process, the ionic monomer unit derived from the ionic ethylenically unsaturated monomer may not be included in the polymer layer (B), but usually included in an amount of 5% by mass or less, preferably 0.01 to 2.5% by mass, further preferably 0.01 to 2.0% by mass based on the mass of 100% by mass of the polymer in the polymer layer (B). If the amount of the ionic ethylenically unsaturated monomer to be used is more than 5% by mass, water resistance of the resulting coating film tends to be deteriorated.

It is preferable that the surfactant to be used for production of the aqueous dispersion of composite particles include a surfactant (a) and a surfactant (b) described later.

The surfactant can be added at three stages: at the initial stage of polymerization (before initiation of polymerization), in the polymerization process and after completion of the polymerization process. For example, the ethylenically unsaturated monomer is polymerized after a predetermined amount of the surfactant (a) is mixed with the dispersion including the particle (A) at the initial stage of production.

The surfactant (a) is a multi-chain hydrophilic group type compound having two or more hydrophobic groups and at least one hydrophilic group in the molecule, and is preferably an anionic surfactant. A hydrophilic group of the anionic surfactant is, for example, at least one group selected from a carboxyl group, a sulfonic acid group, a sulfonate group, a phosphoric acid ester group and salts thereof. The anionic surfactant having a hydrophilic group can be selected because the anionic surfactant easily adsorbs to the particle (A), anionic surfactant has solubility in the ethylenically unsaturated monomer, and the ethylenically unsaturated monomer is weak in emulsifying capacity into water.

The amount of adsorption of the anionic surfactant to 100 parts by mass of the particle (A) at 60° C. is preferably 0.1 parts by mass or more, more preferably 0.5 parts by mass or more. The anionic surfactant is preferably dispensed in a comonomer phase (ethylenically unsaturated monomer phase) at 70° C. in a 1:1 mixture (mass ratio) of the ethylenically unsaturated monomer and water in an amount of 0.5% by mass or more, further preferably 1.0% by mass or more.

The anionic surfactant to be used as the surfactant (a) can be selected from an alkylallylsulfosuccinate salt and a dialkylsulfosuccinate salt. It is particularly preferable that the anionic surfactant to be used as the surfactant (a) be, for example, at least one selected from a dioctylsulfosuccinate salt, a dihexylsulfosuccinate salt, an alkylallylsulfosuccinate salt (for example, product name: Eleminol JS-2 and JS-5 (Sanyo Chemical Industries, Ltd.)) and an alkyl or alkenyl 2-hydroxy(3 allyloxy)propiosulfosuccinate salt (for example, product name: Latemul S-120, S-180A and S-180 (Kao Corporation)). Two or more surfactants may be used in combination, and use conditions of the surfactant in emulsion polymerization may follow usual conditions and are not particularly limited. The sulfonate salt refers to an alkali metal salt or an ammonium salt, and specific examples thereof include a lithium salt, a sodium salt, a potassium salt, an ammonium salt, an alkanol ammonium salt, and ammonium of basic amino acid. The alkylallylsulfosuccinate salt and the alkenyl 2-hydroxy(3allyloxy)propiosulfosuccinate salt are each an anionic reactive surfactant, and can also be exemplified as the ionic ethylenically unsaturated monomer.

The amount of the surfactant (a) in the dispersion including the particle (A) is, for example, 0.05 to 25% by mass based on the total amount of the monomer. The amount of adsorption of the surfactant to the particle (A) at 60° C. is determined by a surface tensiometer with a hanging drop method (pendant drop method) or by electrical conductometric titration, and the surfactant can be preferably used in the range from 0.1 to 10 times, further preferably in the range from 0.2 to 5 times the amount of adsorption. If the surfactant is used out of the range, a low zeta potential can be difficult to exhibit. The amount of adsorption of the surfactant to the particle (A) is determined by adding the surfactant to a dispersion with a concentration of 5% by mass or more of the particle (A), and defining, as the endpoint, a point where the measurement value of the surface tension at 60° C., which is decreased along with an increase in the amount of addition, reaches a certain value (within ±1.0 mN/m). It is difficult in surface tension measurement by a plate method or a ring method to obtain an accurate measurement value because the inorganic material is attached to a plate or a ring of a measurement tool not to stabilize the measurement value. The surface tensiometer with a hanging drop method can be used to thereby obtain an accurate value of the amount of adsorption.

As the surfactant used in the step of polymerizing the ethylenically unsaturated monomer to produce the composite particles (the polymerization process) for emulsion polymerization or miniemulsion polymerization, other surfactant (b) different from the surfactant (a) may also be further used in addition to the surfactant (a). That is, the step of producing the composite particle (the step of forming the polymer layer (B)) may include adding the surfactant (a) to the dispersion including the particle (A), and thereafter polymerizing the monomer after simultaneously adding or while feeding the monomer and the surfactant (b) to the dispersion. A part of the surfactant (a) may also be fed to the dispersion at the same time as feeding of the monomer and the surfactant (b). The surfactant can be used in combination of two or more to thereby particularly easily obtain a dispersion including the composite particles having a low zeta potential. As the surfactant (a) or the surfactant (b), an anionic surfactant and/or a nonionic surfactant can be used.

The surfactant (b) to be fed to the dispersion for polymerization reaction for the purpose of stabilizing polymerization in the polymerization process in the present embodiment is fed to the dispersion at the same time as or separately from feeding of the ethylenically unsaturated monomer. The type of the surfactant (b) is not particularly limited and is preferably an anionic surfactant. The amount of the surfactant (b) to be used is, for example, 25% by mass or less, preferably 0.01 to 10% by mass, further preferably 0.01 to 5% by mass based on the total amount of the monomer. If the amount to be used is more than such a value, it tends to be difficult to exhibit a low zeta potential.

It is preferable that a part or all of the surfactant (b) to be used in the step of polymerizing the monomer to produce the composite particle be an anionic surfactant. The surfactant (b) can include an anionic surfactant that is dispensed in the monomer phase at 70° C. in a 1:1 mixture of the monomer and water in an amount of preferably 5.0% by mass or less, more preferably 2.0% by mass or less.

Examples of the anionic surfactant (b) include fatty acid soap, an alkylsulfonate salt, an alkenylsulfonate salt, an alkylarylsulfonate salt (e.g., alkyl benzenesulfonate salt and alkyldiphenylsulfonate salt), an alkenylarylsulfonate salt, isethionate salt type alkyl fatty acid esters, isethionate salt type alkenyl fatty acid esters, an alkyl diphenyl ether disulfonate salt (for example, product name: Pelex SS-L, Pelex SS-H (Kao Corporation)), an alkyl sulfate salt, an alkenyl sulfate salt, an alkylaryl sulfate salt and an ethoxylated alkylphenol sulfate salt. The "sulfonate salt" and "sulfate salt" refer to an alkali metal salt or an ammonium salt, and specific examples include a lithium salt, a sodium salt, a potassium salt, an ammonium salt, an alkanol ammonium salt, and an ammonium salt of basic amino acid. It is preferable that the surfactant (b) include at least one selected from an alkylsulfonate salt, an alkylbenzenesulfonate salt and an alkyl diphenyl ether disulfonate salt.

As the anionic surfactant (b), a so-called reactive surfactant having a hydrophilic group and a lipophilic group and having an ethylenically unsaturated bond group may also be used in order to exhibit high water resistance and warm water resistance of a coating film. Examples of the anionic surfactant as the reactive surfactant include an ethylenically unsaturated monomer having a sulfonic acid group, a sulfate ester group or a salt thereof. Examples include a compound having a sulfonic acid group and a group (ammonium sulfonate group or alkali metal sulfonate group) that is an ammonium salt or alkali metal salt thereof. Specific examples of the reactive surfactant include salts of polyoxyethylene alkyl propenyl phenyl ether sulfate esters (for example, product name: Aqualon HS-10 (DKS Co., Ltd.)), salts of α-[1-[(allyloxy) methyl]-2-(phenylphenoxy)ethyl]-ω-polyoxyethylene sulfuric acid esters (for example, product name: Adeka Reasoap SE-1025A produced by Adeka Corporation), ammonium salts of α-sulfo-ω-(1-(alkoxy) methyl)-2-(2-propenyloxy)ethoxy)-poly(oxy-1-,2-ethanediyl) (for example, product name: SR-1025 produced by Adeka Corporation) and ammonium=α-sulfonato-ω-1-(allyloxymethyl)alkyloxypolyoxyethylene s (for example, product name: Aqualon KH-10 (DKS Co., Ltd.)).

In the present embodiment, a nonionic surfactant or the like can also be used as the surfactant (b), besides the reactive surfactant having a hydrophilic group and a lipophilic group and having an ethylenic double bond group.

As the nonionic surfactant (b), a so-called reactive surfactant having a hydrophilic group and a lipophilic group and having an ethylenic double bond group may also be used in order to exhibit high water resistance of a coating film. Examples of the nonionic surfactant as the reactive surfactant include
α-[1-[(allyloxy)methyl]-2-(phenylphenoxy)ethyl]-ω-hydroxypolyoxyethylene (for example, product name: Adeka Reasoap NE-20, NE-30 and NE-40 produced by Adeka Corporation) and polyoxyethylene alkyl propenyl phenyl ethers (for example, product name: Aqualon RN-10, RN-20, RN-30 and RN-50 (DKS Co., Ltd.)).

In the present embodiment, a usual surfactant can also be used as the surfactant (b), besides the reactive surfactant having a hydrophilic group and a lipophilic group and having an ethylenic double bond group. A non-reactive nonionic surfactant such as polyoxyethylene alkyl ethers, polyoxyethylene alkylallyl ethers, polyoxyethylene sorbitan fatty acid esters or an oxyethylene-oxypropylene block copolymer can be used.

The type of the surfactant to be added to the aqueous dispersion of composite particles after completion of the polymerization process in the present embodiment is not particularly limited and is preferably nonionic and/or anionic surfactant(s). The amount of the surfactant to be added to the aqueous dispersion of composite particles after completion of the polymerization process, to be used, is preferably 10% by mass or less, more preferably 5% by mass or less based on the total mass of the monomer. If the amount to be used is more than such a value, water resistance of the resulting coating film tends to be remarkably deteriorated.

Polymerization Initiator for Production of Aqueous Dispersion of composite particles When the aqueous dispersion of composite particles is produced, a radical polymerization initiator can be used. The radical polymerization initiator is a compound that is radically decomposed by heat, a reducible substance or the like to allow radical polymerization of the monomer to occur.

As a water-soluble initiator, a water-soluble persulfate salt, peroxide, an azobis compound or the like can be used. Examples of them include potassium persulfate, sodium persulfate, ammonium persulfate, hydrogen peroxide, t-butylhydroperoxide and 2,2-azobis(2-diaminopropane)hydrochloride.

Examples of an oil-soluble initiator include t-butyl peroxybenzoate, 2,2-azobisisobutyronitrile and 2,2-azobis(2,4-dimethylvaleronitrile).

Preferably, in the case of emulsion polymerization, the water-soluble initiator is used singly or the water-soluble initiator and the oil-soluble initiator are used in combination, and in the case of miniemulsion polymerization, the oil-soluble initiator is used. The amount of the water-soluble initiator is preferably usually 0.01 to 10% by mass, preferably 0.01 to 1.0% by mass based on the total mass of the monomer. The amount of the oil-soluble initiator is usually 0.01 to 10% by mass, preferably 0.01 to 0.1% by mass based on the total mass of the monomer. When it is desired to increase the polymerization speed and conduct polymerization at a lower temperature, a reducing agent such as sodium bisulfite, ferrous chloride, an ascorbate salt or rongalit can be used in combination with the radical polymerization initiator.

The polymerization temperature is determined depending on the decomposition temperature of the initiator, and emulsion polymerization is usually performed at 90° C. or lower, which is equal to or lower than the boiling point of water.

When emulsion polymerization or miniemulsion polymerization is performed, the polymerization reaction time (maturation time, cooking time) after the monomer is fed to the dispersion is preferably 10 minutes or more, although it varies depending on the polymer concentration in an emulsion to be finally obtained. If the polymerization reaction time is such a time or less, the unreacted monomer can remain.

In polymerization of the monomer, a chain transfer agent can also be added in the polymerization process in order to modulate the molecular weight after polymerization, and a mixture including 0.1 to 5% by mass of the chain transfer agent can be obtained. If the amount of the chain transfer agent is 0.1% by mass or less, the viscosity of an aqueous solution or an aqueous dispersion tends to be exhibited at a high value to make handling difficult, and if the amount is 5% by mass or more, water resistance of a coating film tends to be deteriorated. Specific examples of the chain transfer agent include mercaptans such as butylmercaptan, n-dodecylmercaptan and t-dodecylmercaptan, alcohols such as methanol and isopropyl alcohol, an α-methylstyrene dimer, and carbon tetrachloride.

<Aqueous Dispersion of Composite Particles>

In order to keep storage stability of the aqueous dispersion of composite particles for a long period, it is preferable that the pH of the aqueous dispersion of composite particles be adjusted within the range from 7 to 10 by use of ammonia, sodium hydroxide, potassium hydroxide, or amine such as dimethylaminoethanol.

The volume ratio of a dispersoid (composite particle) to a dispersion medium (aqueous medium) (composite particle/aqueous medium) in the aqueous dispersion of composite particles is preferably 70/30 or less, more preferably 5/95 or more and 60/40 or less.

The aqueous medium can include, in addition to water, an hydrophilic solvent, for example, alcohols such as ethanol and isopropyl alcohol, ketones such as acetone, and ethers such as tetrahydrofuran and dioxane.

It is possible to arbitrarily compound an ultraviolet absorber, a light stabilizer and a colloidal inorganic solid particle, in addition to components to be usually added and compounded in an aqueous paint, such as a film formation aid, a thickener, a defoamer, a pigment, a disperser, a dye and a preservative, in the composite particle dispersion of the present embodiment. In particular, the colloidal inorganic solid particle is effective for more enhancing contamination resistance. The content of the colloidal inorganic solid particle is preferably 1 to 50% by mass, further preferably 2 to 15% by mass based on the mass of the composite particles in the aqueous dispersion. When the content of the colloidal inorganic solid particle is in this range, a coating film formed from the aqueous dispersion of composite particles is hardly whitened even if immersed in water.

It is preferable for imparting high weather resistance to allow the ultraviolet absorber and/or the light stabilizer to be contained in the aqueous dispersion of composite particles. In the method for allowing them to be contained in an emulsion, the ultraviolet absorber and/or the light stabilizer may be added after mixed with the film formation aid or the like, but is preferably allowed to be present during emulsion polymerization. The ultraviolet absorber and/or the light stabilizer is preferably used in an amount of 0.1% by mass to 5% by mass based on the total mass of the radical polymerizable monomer. A radical polymerizable ultraviolet absorber having a radical polymerizable double bond in the molecule, and a radical polymerizable light stabilizer having a radical polymerizable double bond in the molecule can also be used as the ultraviolet absorber and the light stabilizer, respectively. It is preferable that the ultraviolet absorber and the light stabilizer be used in combination because, when a film is formed using the aqueous dispersion of composite particles, the film is excellent particularly in weather resistance.

Specific examples of a benzotriazole type ultraviolet absorber include 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2-hydroxy-5-tert-octylphenyl)benzotriazole, 2-(2-hydroxy-3,5-di-tert-octylphenyl)benzotriazole, 2-[2'-hydroxy-3",5'-bis(α,α'-dimethylbenzyl) phenyl]benzotriazole), a condensation product (product name: TINUVIN 1130 produced by BASF Japan Ltd.) of methyl-3-[3-tert-butyl-5-(2H-benzotriazole-2-yl)-4-hydroxyphenyl]propionate and polyethylene glycol (molecular weight: 300), isooctyl-3-[3-(2H-benzotriazole-2-yl)-5-tert-butyl-4-hydroxyphenyl]propionate (product name: TINUVIN 384 produced by BASF Japan Ltd.), 2-(3-dodecyl-5-methyl-2-hydroxyphenyl)benzotriazole (product name: TINUVIN 571 produced by BASF Japan Ltd.), 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-4'-octoxyphenyl)benzotriazole, 2-[2'-hydroxy-3'-(3",4",5",6"-tetrahydrophthalimidemethyl)-5'-methylphenyl]benzotriazole, 2,2-methylenebis[4-(1,1,3,3-tetramethylbutyl)-6-(2H-benzotriazole-2-yl)phenol], and 2-(2H-benzotriazole-2-yl)-4,6-bis(1-methyl-1-phenylethyl)phenol (product name: TINUVIN 900 produced by BASF Japan Ltd.). Specific examples of a radical polymerizable benzotriazole type ultraviolet absorber include 2-(2'-hydroxy-5'-methacryloxyethylphenyl)-2H-benzotriazole (product name: RUVA-93 produced by Otsuka Chemical Co., Ltd.), 2-(2'-hydroxy-5'-methacryloxyethyl-3-tert-butylphenyl)-2H-benzotriazole, 2-(2'-hydroxy-5'-methacryloxypropyl-3-tert-butylphenyl)-5-chloro-2H-benzotriazole, and 3-methacryloyl-2-hydroxypropyl-3-[3'-(2"-benzotriazolyl)-4-hydroxy-5-tert-butyl]phenylpropionate (product name: CGL-104 produced by BASF Japan Ltd.).

Examples of a triazine type ultraviolet absorber include TINUVIN 400 (product name, produced by BASF Japan Ltd.).

A hindered amine type light stabilizer is preferably one low in basicity, specifically preferably one having a base constant (pKb) of 8 or more. Specific examples of the hindered amine type light stabilizer include bis(2,2,6,6-tetramethyl-4-piperidyl)succinate, bis(2,2,6,6-tetramethyl-piperidyl)sebacate, bis(1,2,2,6,6-pentamethyl-4-piperidyl)2-(3,5-di-tert-butyl-4-hydroxybenzyl)-2-butylmalonate, 1-[2-

[3-(3,5-di-tert-butyl-4-hydroxyphenyl)propynyloxy]ethyl]-4-[3-(3,5-di-tert-butyl-4-hydroxyphenyl)propynyloxy]-2,2,6,6-tetramethylpiperidine, a mixture (product name: TINUVIN 292 produced by BASF Japan Ltd.) of bis(1,2,2,6,6-pentamethyl-4-piperidyl)sebacate and methyl-1,2,2,6,6-pentamethyl-4-piperidyl-sebacate, bis(1-octoxy2,2,6,6-tetramethyl-4-piperidyl)sebacate, and TINUVIN 123 (product name, produced by BASF Japan Ltd.). Specific examples of a radical polymerizable hindered amine type light stabilizer include 1,2,2,6,6-pentamethyl-4-piperidyl methacrylate, 1,2,2,6,6-pentamethyl-4-piperidyl acrylate, 2,2,6,6-tetramethyl-4-piperidyl methacrylate, 2,2,6,6-tetramethyl-4-piperidyl acrylate, 1,2,2,6,6-pentamethyl-4-iminopiperidyl methacrylate, 2,2,6,6,-tetramethyl-4-iminopiperidyl methacrylate, 4-cyano-2,2,6,6-tetramethyl-4-piperidyl methacrylate and 4-cyano-1,2,2,6,6-pentamethyl-4-piperidyl methacrylate.

The aqueous dispersion of composite particles may also include a polymer dispersion stabilizer such as (partially saponified) polyvinyl alcohol, methylcellulose, hydroxyethylcellulose and polyvinylpyrrolidone, a thickener such as a polyether type thickener, a plasticizer, a film formation aid, or a combination thereof. Components to be usually added and compounded in a paint, various coating materials, and the like, such as a viscosity modifier, a pH modifier, a defoamer, a pigment, a filler, a disperser, a dye, a preservative, a surfactant, a heat stabilizer, an ultraviolet absorber, an antioxidant, a light stabilizer, a flame retardant, an organic solvent, a lubricant, a surfactant, a thickener, a plasticizer, a film formation aid, and a corrosion inhibitor are arbitrarily compounded in the aqueous dispersion of composite particles. These can be dispersed in the dispersion medium by use of a disperser such as an attritor or a sand mill, and the dispersion is adjusted so as to achieve a predetermined viscosity.

EXAMPLES

Hereinafter, the present invention is further specifically described with reference to Examples and the like, but the present invention is not limited to these Examples at all.

<Surface Tension Measurement by Surface Tensiometer with Hanging Drop Method, and Method for Determining Amount of adsorption of surfactant to particle (A) at 60° C.>

The concentration of the particle (A) in the aqueous dispersion was adjusted by distilled water so as to be 10% by mass based on the mass of the dispersion. The amount of adsorption of the surfactant to the particle (A) was determined by adding the surfactant to the dispersion, and defining, as the endpoint, a point where the measurement value of the surface tension at 60° C., which was decreased along with an increase in the amount of addition of the surfactant, reached a certain value (within ±1.0 mN/m). Surface tension measurement of the dispersion to which the surfactant was added was performed under the following conditions.

Apparatus name: Drop Master DM-701 manufactured by Kyowa Interface Science Co., Ltd.
Measurement mode: surface tension measurement with hanging drop method
Calculation method: Young laplace method
Measurement temperature: 60° C.

<Measurement of Zeta Potential>

The zeta potential of the composite particles in the aqueous dispersion at 60° C. was measured using a aqueous dispersion of composite particles having a pH of 7 to 11, or a dispersion for measurement having a pH of 7 to 11, prepared by diluting the dispersion in the polymerization process with an aqueous 10 mM KCl solution. When the pH of the aqueous dispersion of composite particles was less than 7, the dispersion for measurement was prepared by adjusting the pH by an aqueous NaOH solution so that it was 7 to 11, and thereafter diluting the aqueous dispersion of composite particles with an aqueous 10 mM KCl solution. The measurement conditions of the zeta potential are as follows.

Apparatus name: ELSZ-1000 manufactured by Otsuka Electronics Co., Ltd.
Measurement temperature: 60° C.

Calculation of the zeta potential from the electrophoretic mobility was performed by the method using the Smoluchowski equation. The value of the zeta potential measured is a numerical value expressed by processing the value output from the apparatus with one peak fit.

Further specifically, the aqueous dispersion of composite particles, or the aqueous dispersion of composite particles (emulsion) in the polymerization process was diluted with an aqueous 10 mM KCl solution so that the concentration of the composite particles was 10% by mass based on the mass of the dispersion, to prepare the dispersion for measurement. When it was impossible to make measurement at a concentration of 10% by mass, an aqueous 10 mM KCl solution was appropriately added. With respect to a specific dilution concentration, the upper concentration that can be measured is determined depending on the particle size of the composite particles. Therefore, the concentration of the composite particles after dilution with an aqueous 10 mM KCl solution is usually 0.001% by mass or more and 20% by mass or less, preferably 0.1% by mass or more and 10% by mass or less, further preferably 1.0% by mass or more and 10% by mass or less based on the mass of the dispersion. The dispersion for measurement was placed in a standard cell of the apparatus and subjected to measurement. The KCl concentration in the dispersion for measurement is usually 1 to 50 mM. An appropriate amount of the aqueous dispersion of composite particles in the polymerization process was sampled from the dispersion in the polymerization reaction. The dispersion sampled was transferred to a small vessel and held under purging with nitrogen at the polymerization temperature for 1 hour, and thereafter the dispersion for measurement was prepared in the same procedure.

<Measurement of Zeta Potential after Dialysis>

An appropriate volume of a aqueous dispersion of composite particles diluted to 20-fold with 0.001 N NaOH (aqueous 1.0 mM NaOH solution) was measured on an ultrafiltration membrane (Vivaspin 6, molecular weight cut off: 100000 (100 K), membrane material: PES, produced by Sartorius Stedim Biotech GmbH), and subjected to dialysis by filtration using a centrifugal separator at a number of rotations of 500 rpm to concentrate the aqueous dispersion composite particles until the volume reached 0.5 times. To the aqueous dispersion of composite particles (filtration residue) after concentration was added the same amount of an aqueous 1.0 mM NaOH solution, and the resultant was again concentrated by dialysis using the same ultrafiltration membrane, until the volume reached 0.5 times. Furthermore, the same amount of an aqueous 1.0 mM NaOH solution was added to the dispersion (filtrate) concentrated, and the resultant was again concentrated by dialysis using the same ultrafiltration membrane, until the volume reached 0.5 times. When the aqueous dispersion of composite particles concentrated had a pH of 7 to 11, this was diluted by addition of the same volume of an aqueous 20 mM KCl solution, to adjust the KCl concentration to about 10 mM. When the aqueous dispersion of composite particles concentrated had a pH of less than 7, the pH was adjusted to 7 to 11 by addition of an aqueous NaOH solution. The dispersion for measurement after dialysis, thus obtained, was used to measure the zeta potential at 25° C. in the same conditions as described above.

Herein, when it was impossible to make measurement in the concentration condition, an aqueous 10 mM KCl solution was appropriately added. With respect to a specific dilution concentration, the upper concentration that can be measured is determined depending on the particle size of the composite particles. Therefore, the concentration of the composite particles after dilution with an aqueous KCl solution is usually 0.001% by mass or more and 20% by mass or less, preferably 0.1% by mass or more and 10% by mass or less, further preferably 1.0% by mass or more and 10% by mass or less based on the mass of the dispersion. The KCl concentration in the dispersion for measurement is usually 1 to 50 mM.

<Measurement of MFT (Minimum Film-Forming Temperature)>

The MFT was measured according to the temperature gradient plate method described in the ISO Standard 2115 or HS K6828-2.

<Warm Water Resistance Test>

To the aqueous dispersion of composite particles was added 2 to 5% of Texanol CS-12 (produced by INC Corporation), and sufficiently stirred to prepare a coating mixture. A predetermined substrate was coated with this coating mixture to form a coating film having a thickness of about 80 μm. The coating film was dried at 23° C. for 1 week, and thereafter immersed in warm water at 50° C. for 24 hours. The outer appearance of the coating film after immersion was confirmed, and the warm water resistance was rated according to the following criteria.

A: the shape of the coating film was kept and transparency was maintained, or slight whitening was observed, but transparency was maintained.

B: the shape of the coating film was kept and whitening was observed.

C the shape of the coating film was not kept and whitening was observed.

Example 1

To a reactor having a reflux condenser, a drop tank, a thermometer and a stirring apparatus was loaded 333.3 g of Adelite (registered trademark) AT-50 (aqueous dispersion of silica particles (colloidal silica), produced by Adeka Corporation, pH: 10.2) in which the concentration was adjusted to 51.0% by mass, and the temperature was raised to 60° C. 30 g of an aqueous solution of AEROSOL (registered trademark) OT-75 (sodium dioctylsulfosuccinate (surfactant (a)), produced by CBC Co., Ltd.), in which the concentration was adjusted to 10% by mass, was slowly added thereto. The amount of adsorption of AEROSOLOT-75 to Adelite AT at 60° C. was 3.1% by mass. The dispersion in the reactor was heated to 70° C. under a nitrogen atmosphere, and thereafter 50 g of sodium persulfate (2% aqueous solution) was added. After 5 minutes, a mixture of 34 g of methyl methacrylate, 65 g of butyl acrylate and 1.0 g of methacrylic acid, 6 g of an aqueous solution of Pelex (registered trademark) SS-L (alkyl diphenyl ether disulfonate salt (surfactant (b)), produced by Kao Corporation), in which the concentration was adjusted to 48% by mass, and 130 g of ion exchange water was allowed to feed in the reactor over 90 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 51 nm, in which the pH was 8.9 and the solid content was 42.6% by mass. The zeta potential of the composite particles in the resulting dispersion at 60° C. was −80 mV.

The zeta potential of the composite particles in the aqueous dispersion of composite particles after dialysis was measured, and consequently the zeta potential at a pH of 7.9 and at 25° C. was −75 mV.

The aqueous dispersion of composite particles (emulsion) in the polymerization process, which was sampled from the reactor after 45 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 8.7 and at 60° C. was −97 my.

To the aqueous dispersion of composite particles was added 2% of Texanol CS-12 and testing was performed according to the warm water resistance test, and consequently the rating was "A".

Example 2

To a reactor having a reflux condenser, a drop tank, a thermometer and a stirring apparatus was loaded 354.2 g of Snowtex (registered trademark) ST-50 (aqueous dispersion of silica particles (colloidal silica), produced by Nissan Chemical Industries. Ltd.) in which the pH was adjusted to 10.0 and the concentration was adjusted to 50.5% by mass by an aqueous potassium hydroxide solution, and the temperature was raised to 60° C. 40 g of an aqueous solution of Pelex (registered trademark) OT-P (sodium dioctylsulfosuccinate (surfactant (a)), produced by Kao Corporation), in which the concentration was adjusted to 10% by mass, was slowly added thereto. The amount of adsorption of Pelex OT-P to Snowtex ST-50 at 60° C. was 3.0% by mass. The dispersion in the reactor was heated to 70° C. under a nitrogen atmosphere, and thereafter 50 g of ammonium persulfate (2% aqueous solution) was added. After 5 minutes, a mixture of 85 g of methyl methacrylate, 164 g of butyl acrylate and 1.0 g of methacrylic acid, 30 g of an aqueous 15% solution of Neopelex G-15 (sodium dodecylbenzenesulfonate (surfactant (b)), produced by Kao Corporation), 20 g of an aqueous solution of AEROSOL (registered trademark) OT-75 (sodium dioctylsulfosuccinate (surfactant (a)), produced by CBC Co., Ltd.), in which the concentration was adjusted to 10% by mass, 10 g of ammonium persulfate (2% aqueous solution), and 150 g of ion exchange water was allowed to feed in the reactor over 180 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 58 nm, in which the pH was 8.7 and the solid content was 47.5% by mass. The zeta potential of the composites particle in the resulting dispersion at 60° C. was −95 mV.

The zeta potential of the composite particles in the aqueous dispersion of composite particles after dialysis was measured, and consequently the zeta potential at a pH of 8.0 and at 25° C. was −82 my.

The aqueous dispersion of composite particles (emulsion) in the polymerization process, which was sampled from the reactor after 18 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.5 and at 60° C. was −105 mV.

To the aqueous dispersion of composite particles was added 2% of Texanol CS-12 and testing was performed according to the warm water resistance test, and consequently the rating was "A".

Example 3

To a reactor having a reflux condenser, a drop tank, a thermometer and a stirring apparatus was loaded 294 g of Snowtex (registered trademark) ST-UP (aqueous dispersion of chain-shaped silica particles, produced by Nissan Chemical Industries. Ltd., pH: 10.0) adjusted to 22.1% by mass, and the temperature was raised to 60° C. Twenty g of an aqueous solution of AEROSOL (registered trademark) OT-75 (sodium dioctylsulfosuccinate (surfactant (a)), produced by CBC Co., Ltd.), in which the concentration was adjusted to 10% by mass, was slowly added thereto. The amount of adsorption of AEROSOLOT-75 to Snowtex ST-UP at 60° C. was 1.6% by mass. The dispersion in the reactor was heated to 70° C. under a nitrogen atmosphere, and thereafter 15 g of ammonium persulfate (2% aqueous solution) was added. After 5 minutes, a mixture of 10 g of butyl methacrylate, 6 g of butyl acrylate and 0.3 g of acrylic acid, 2.7 g of Pelex SS-L (an aqueous solution of surfactant (b), produced by Kao Corporation), in which the concentration was adjusted to 48% by mass, and 80 g of ion exchange water was allowed to feed in the reactor over 40 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 51 nm, in which the pH was 9.5 and the solid content was 19.5% by mass. The zeta potential of the composites particle in the resulting dispersion at 60° C. was −78 mV.

The zeta potential of the composite particles in the aqueous dispersion of composite particles after dialysis was measured, and consequently the zeta potential at a pH of 8.5 and at 25° C. was −73 mV.

To the aqueous dispersion of composite particles was added 2% of Texanol CS-12 and testing was performed according to the warm water resistance test, and consequently the rating was "A".

Example 4

To a reactor having a reflux condenser, a drop tank, a thermometer and a stirring apparatus was loaded 327.9 g of NanoUse (registered trademark) 30BS (aqueous dispersion of zirconia particles, produced by Nissan Chemical Industries. Ltd., pH: 10.3) adjusted to 30.5% by mass, and the temperature was raised to 60° C. 30 g of an aqueous solution of AEROSOL (registered trademark) MA-80 (sodium dihexylsulfosuccinate (surfactant (a)), produced by CBC Co., Ltd.), in which the concentration was adjusted to 10% by mass, was slowly added thereto. The amount of adsorption of AEROSOLMA-80 to NanoUse 30B S at 60° C. was 0.6% by mass. The dispersion in the reactor was heated to 70° C. under a nitrogen atmosphere, and thereafter 30 g of potassium persulfate (2% aqueous solution) was added. After 5 minutes, a mixture of 10 g of styrene, 10 g of methyl methacrylate, 29 g of butyl acrylate and 1.0 g of methacrylic acid, 15 g of an aqueous 15% solution of Neopelex (registered trademark) G-15 (sodium dodecylbenzenesulfonate (surfactant (b)), produced by Kao Corporation), and 100 g of ion exchange water was allowed to feed in the reactor over 60 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 82 nm, in which the pH was 8.8 and the solid content was 28.1% by mass. The zeta potential of the composite particles in the resulting aqueous dispersion of composite particles at 60° C. was −87 my.

The aqueous dispersion of composite particles (emulsion) in the polymerization process, which was sampled from the reactor after 12 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.5 and at 60° C. was −90 mV.

The zeta potential of the composite particles in the aqueous dispersion of composite particles after dialysis was measured, and consequently the zeta potential at a pH of 8.1 and at 25° C. was −78 mV.

To the aqueous dispersion of composite particles was added 2% of Texanol CS-12 and testing was performed according to the warm water resistance test, and consequently the rating was "B".

Example 5

To a reactor having a reflux condenser, a drop tank, a thermometer and a stirring apparatus was loaded 333.3 g of Adelite (registered trademark) AT-50 (aqueous dispersion of silica particles (colloidal silica), produced by Adeka Corporation, pH: 10.2) in which the concentration was adjusted to 51.0% by mass, and the temperature was raised to 60° C. 30 g of an aqueous solution of Eleminol (registered trademark) JS-2 (sodium alkylallylsulfosuccinate (surfactant (a)), produced by Sanyo Chemical Industries, Ltd.), in which the concentration was adjusted to 10% by mass, was slowly added thereto. The amount of adsorption of Eleminol JS-2 to Adelite AT-50 at 60° C. was 1.8% by mass. The dispersion in the reactor was heated to 70° C. under a nitrogen atmosphere, and thereafter 50 g of sodium persulfate (2% aqueous solution) was added thereto. After 5 minutes, a mixture of 34 g of methyl methacrylate, 65 g of butyl acrylate and 1.0 g of 2-(methacryloyloxy)ethyl phosphate (phosphate monoesters of 2-hydroxyethyl methacrylate) (PPME: produced by Toho Chemical Industry Co., Ltd.), 6 g of Pelex (registered trademark) SS-L (surfactant (b), produced by Kao Corporation) in which the concentration was adjusted to 48% by mass, and 130 g of ion exchange water was allowed to feed in the reactor over 90 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 56 nm, in which the pH was 9.3 and the solid content was 42.5% by mass. The zeta potential of the composite particles in the resulting dispersion at 60° C. was −103 mV.

The zeta potential of the composite particles in the aqueous dispersion of composite particles after dialysis was measured, and consequently the zeta potential at a pH of 7.9 and at 25° C. was −92 mV.

The aqueous dispersion of composite particles) (emulsion) in the polymerization process, which was sampled from the reactor after 45 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.7 and at 60° C. was −106 mV.

To the aqueous dispersion of composite particles was added 5% of Texanol CS-12 and testing was performed according to the warm water resistance test, and consequently the rating was "A".

Example 6

<Production Example of Silica-encapsulated Particle (A)>

To a reactor equipped with a stirrer, a reflux condenser, a drop tank and a thermometer was loaded 290 g of water and 10 g of an aqueous 20% Eleminol JS-2 (sodium alkylallylsulfosuccinate) solution. After the temperature in the reaction vessel was raised to 80° C., 10 g of an aqueous 2% ammonium persulfate solution was added thereto, and after 5 minutes, an emulsified mixture including 106 g of methyl methacrylate, 90 g of 2-ethylhexyl acrylate and 4 g of methacrylic acid as monomers at the first state, and 30 g of an aqueous 2% ammonium persulfate solution and 96 g of water was allowed to feed in from the drop tank over 80 minutes. The temperature in the reaction vessel was kept at 80° C. during the infeed. After completion of the infeed, the temperature in the reaction vessel was kept at 80° C. for 30 minutes. Next, an emulsified mixture including 68 g of methyl methacrylate, 20 g of 2-ethylhexyl acrylate, 10 g of methacrylic acid and 2 g of acrylamide as monomers at the second state, 5 g of an aqueous 20% Eleminol JS-2 solution, 15 g of an aqueous 2% ammonium persulfate solution, and 48 g of water was allowed to feed from the drop tank over 40 minutes. The temperature in the reaction vessel was kept at 80° C. during the infeed. After completion of the infeed, the temperature in the reaction vessel was kept at 80° C. for 30 minutes. Next, an emulsified mixture including 150 g of methyl methacrylate, 46 g of 2-ethylhexyl acrylate, 4 g of methacrylic acid and 4 g of acrylamide as monomers at the third state, 10 g of an aqueous 20% Eleminol JS-2 solution, 30 g of an aqueous 2% ammonium persulfate solution, and 96 g of water was allowed to feed in from the drop tank over 80 minutes. The temperature in the reactor was kept at 80° C. during the infeed. After completion of the infeed, the temperature in the reactor was kept at 80° C. for 120 minutes. From the above operations, an acrylic emulsion including an acrylic polymer particle and water was obtained. The pH of the acrylic emulsion after cooling to room temperature was 2.0.

The acrylic emulsion was filtered by a 100-mesh metal screen. The dry weight of the aggregate separated by filtration was 0.02% relative to the total of the monomers, and was very slight. The solid content of the resulting acrylic emulsion was 44.0% by mass, and a single distribution was exhibited at a particle size of 100 nm.

In the reactor was taken 340.9 g of this acrylic emulsion, and 50 g of water was added under stirring at room temperature. Thereto was added 26.0 g of tetraethoxysilane (TEOS) over 30 minutes. After the emulsion was stirred for additional 1 hour, an aqueous 4% NaOH solution was added to adjust the pH to 10.0, and the emulsion was heated to 60° C. Thus, a dispersion including silica-covered particle (A) having an acrylic polymer particle and a silica layer with which a part or the whole of the surface of the particle was covered was obtained.

<Production Example of Aqueous Dispersion of Composite Particles>

Twenty g of Eleminol (registered trademark) JS-2 (surfactant (a)) in which the concentration was adjusted to 10% by mass was slowly added to the resulting dispersion of the silica-covered particle, while the temperature was maintained at 60° C. The dispersion was heated to 70° C. under a nitrogen atmosphere, and thereafter 20 g of sodium persulfate (2% aqueous solution) was added. After 5 minutes, a mixture of 17 g of methyl methacrylate, 32.5 g of butyl acrylate and 0.5 g of 2-(methacryloyloxy)ethyl phosphate, 6 g of Pelex (registered trademark) SS-L (surfactant (b)) in which the concentration was adjusted to 48% by mass, and 50 g of ion exchange water was allowed to feed in the reactor over 90 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of particles including a composite particle whose average particle size was 110 nm, in which the pH was 9.5 and the solid content was 38.0% by mass. The zeta potential of the composite particles in the resulting dispersion at 60° C. was −88 mV.

The zeta potential of the composite particles in the aqueous dispersion of composite particles after dialysis was measured, and consequently the zeta potential at a pH of 7.9 and at 25° C. was −80 mV.

The aqueous dispersion of composite particles (emulsion) in the polymerization process, which was sampled from the reactor after 45 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.7 and at 60° C. was −94 mV.

To the aqueous dispersion of composite particles was added 5% of Texanol CS-12 and testing was performed according to the warm water resistance test, and consequently the rating was "A".

Example 7

To a reactor having a reflux condenser, a drop tank, a thermometer and a stirring apparatus was loaded 477.4 g of Cataloid (registered trademark) SI80P (aqueous dispersion of silica particles (colloidal silica), produced by Catalysts & Chemicals Industries Co., Ltd.) in which the pH was adjusted to 10.3 by mass and the concentration was adjusted to 41.9% by an aqueous 1% by mass NaOH solution, and the temperature was raised to 60° C. Thereafter, 20 g of an aqueous solution of AEROSOL (registered trademark) OT-75 (sodium dioctylsulfosuccinate (surfactant (a)), produced by CBC Co., Ltd.), in which the concentration was adjusted to 10% by mass, was slowly added thereto. The amount of adsorption of AEROSOLOT-75 to Cataloid SI80P at 60° C. was 1.0% by mass. The dispersion in the reactor was heated to 70° C. under a nitrogen atmosphere, and thereafter 10 g of potassium persulfate (2% aqueous solution) was added. After 5 minutes, a mixture of 10 g of styrene, 58 g of methyl methacrylate and 130 g of butyl acrylate, 2.0 g of sodium p-styrenesulfonate, 0.1 g of α,α'-azobisisobutyronitrile, 10 g of an aqueous 15% solution of Neopelex (registered trademark) G-15 (sodium dodecylbenzenesulfonate (surfactant (b)), produced by Kao Corporation), and 214 g of ion exchange water was allowed to feed in the reactor over 60 minutes. After completion of the infeed, the dispersion was further stirred at 70° C. for 90 minutes. Thereafter, the dispersion was cooled to room temperature and filtered by a 100-mesh metal screen to thereby provide an aqueous dispersion of composite particles including a composite particle whose average particle size was 82 nm, in which the pH was 8.8 and the solid content was 28.1% by mass. The zeta potential of the composite particles in the resulting dispersion at 60° C. was −85 mV.

The aqueous dispersion of composite particles (emulsion) in the polymerization process, which was sampled from the reactor after 12 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.5 and at 60° C. was −93 mV.

The zeta potential of the composite particles in the aqueous dispersion of composite particles after dialysis was measured, and consequently the zeta potential at a pH of 8.1 and at 25° C. was −79 mV.

To the aqueous dispersion of composite particles was added 2% of Texanol CS-12 and testing was performed according to the warm water resistance test, and consequently the rating was "A".

Example 8

To a reactor having a reflux condenser, a drop tank, a thermometer and a stirring apparatus was loaded 829.3 of a dispersion of a titania particle (TTO-W-5, produced by Ishihara Sangyo Kaisha Ltd.), in which the pH was adjusted to 10.1 and the concentration was adjusted to 20.5% by mass by an aqueous NaOH solution, and the temperature was raised to 60° C. Fifteen g of an aqueous solution of Eleminol (registered trademark) JS-2 (sodium alkylallylsulfosuccinate (surfactant (a)), produced by Sanyo Chemical Industries, Ltd.), in which the concentration was adjusted to 10% by mass, was slowly added thereto. The amount of adsorption of Eleminol JS-2 to TTO-W-5 at 60° C. was 0.9% by mass. The dispersion in the reactor was heated to 70° C. under a nitrogen atmosphere, and thereafter 15 g of sodium persulfate (2% aqueous solution) was added. After 5 minutes, a mixture of 17 g of methyl methacrylate, 32.5 g of butyl acrylate and 0.5 g of 2-(methacryloyloxy)ethyl phosphate, 3 g of Pelex (registered trademark) SS-L (aqueous solution of surfactant (b), produced by Kao Corporation), in which the concentration was adjusted to 48% by mass, and 25 g of ion exchange water was allowed to feed in the reactor over 60 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 60 nm, in which the pH was 9.5 and the solid content was 23.6% by mass. The zeta potential of the composite particles in the resulting dispersion at 60° C. was −98 mV.

The zeta potential of the composite particles in the aqueous dispersion of composite particles after dialysis was measured, and consequently the zeta potential at a pH of 8.2 and at 25° C. was −88 mV.

The aqueous dispersion of composite particles (emulsion) in the polymerization process, which was sampled from the reactor after 30 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.7 and at 60° C. was −101 mV.

To the aqueous dispersion of composite particles was added 5% of Texanol CS-12 and testing was performed according to the warm water resistance test, and consequently the rating was "A".

Example 9

<Production Example of Silica-Encapsulated Particle (A)>

To reactor equipped with a stirrer, a reflux condenser, a drop tank and a thermometer were loaded 8 g of methacrylic acid, 47 g of methyl methacrylate, 40 g of butyl acrylate, 5 g of acrylamide, 300 g of water, and 20 g of an aqueous 20% by mass Eleminol (registered trademark) JS-2 (surfactant) solution. After the temperature in the reactor was raised to 78° C., 0.5 g of ammonium persulfate was added thereto and kept for 1 hour. Thus, a seed latex at the first stage was prepared. The hydrogen ion concentration (pH) of the seed latex was 1.8. Next, a mixture including 3 g of methacrylic acid, 157 g of methyl methacrylate, 50 g of cyclohexyl methacrylate, 190 g of butyl acrylate, 330 g of water, 20 g of an aqueous 20% Eleminol (registered trademark) JS-2 solution and 1.0 g of ammonium persulfate, and a silane mixture including 2.5 g of γ-methacryloxypropyltrimethoxysilane, 25 g of dimethyldimethoxysilane and 25 g of methyltrimethoxysilane were allowed to feed in the reactor from the drop tank over 3 hours. The temperature in the reaction vessel was kept at 80° C. during the infeed. After completion of the infeed, the temperature in the reaction vessel was set at 85° C. and kept for 6 hours. From the above operations, an acrylic emulsion including an acrylic polymer particle and water was obtained. The pH of the resulting acrylic emulsion after cooling to room temperature was 2.1.

The solid content of the resulting acrylic emulsion was 44.0% by mass, and a single distribution was exhibited at a particle size of 98 nm. In the reactor was taken 341.0 g of this acrylic emulsion, and 50 g of water was added under stirring at room temperature. Thereto was added 30.0 g of TEOS over 30 minutes, and stirred for additional 1 hour. Thereafter, an aqueous 4% NaOH solution was added to adjust the pH to 10.0, and the reaction mixture was then heated to 60° C. Thus, a dispersion of silica-encapsulated particle (A), having a silica layer with which a part or the whole of the surface of an acrylic polymer particle was covered, was obtained.

<Production Example of Aqueous Dispersion of Composite Particles>

Twenty g of Eleminol (registered trademark) JS-2 (surfactant (a)) in which the concentration was adjusted to 10% by mass was slowly added to the resulting dispersion of the silica-covered particle, while the temperature was maintained at 60° C. The dispersion in the reactor was heated to 70° C. under a nitrogen atmosphere, and thereafter 20 g of sodium persulfate (2% aqueous solution) was added. After 5 minutes, a mixture of 17 g of methyl methacrylate, 32.5 g of butyl acrylate and 0.5 g of 2-(methacryloyloxy)ethyl phosphate, 6 g of Pelex (registered trademark) SS-L (surfactant (b)) in which the concentration was adjusted to 48% by mass, and 50 g of ion exchange water was allowed to feed in the reactor over 30 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 110 nm, in which the pH was 9.5 and the solid content was 38.0% by mass. The zeta potential of the composite particles in the resulting dispersion at 60° C. was −98 mV.

The zeta potential of the composite particles in the aqueous dispersion of composite particles after dialysis was measured, and consequently the zeta potential at a pH of 7.9 and at 25° C. was −85 mV.

The aqueous dispersion of composite particles (emulsion) in the polymerization process, which was sampled from the reactor after 15 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.7 and at 60° C. was −101 mV.

To the aqueous dispersion of composite particles was added 5% of Texanol CS-12 and testing was performed according to the warm water resistance test, and consequently the rating was "A".

Example 10

To a reactor having a reflux condenser, a drop tank, a thermometer and a stirring apparatus was loaded 354.2 g of Snowtex (registered trademark) ST-50 (aqueous dispersion of silica particles (colloidal silica), produced by Nissan Chemical Industries. Ltd.) in which the pH was adjusted to 10.0 and the concentration was adjusted to 50.5% by mass by an aqueous sodium hydroxide solution, and the temperature was raised to 60° C. Thereafter, 40 g of an aqueous solution of Pelex (registered trademark) OT-P (sodium dioctylsulfosuccinate (surfactant (a)), produced by Kao Corporation), in which the concentration was adjusted to 10% by mass, was slowly added. The amount of adsorption of Pelex OT-P to Snowtex ST-50 at 60° C. was 3.0% by mass. The dispersion in the reactor was heated to 70° C. under a nitrogen atmosphere, and thereafter 15 g of ammonium persulfate (2% aqueous solution) was added. After 5 minutes, a mixture of 104.5 g of methyl methacrylate, 81.75 g of butyl acrylate, 62.5 g of butyl methacrylate and 1.25 g of methacrylic acid, 30 g of an aqueous 15% solution of Neopelex G-15 (sodium dodecylbenzenesulfonate (surfactant (b)), produced by Kao Corporation), 20 g of an aqueous solution of AEROSOL (registered trademark) OT-75 (sodium dioctylsulfosuccinate (surfactant (a)), produced by CBC Co., Ltd.), in which the concentration was adjusted to 10% by mass, 10 g of ammonium persulfate (2% aqueous solution), and 150 g of ion exchange water was allowed to feed in the reactor over 180 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 58 nm, in which the pH was 8.7 and the solid content was 49.5% by mass. The zeta potential of the composites particle in the resulting dispersion at 60° C. was −93 mV. The MFT of the dispersion was shown to be 29° C.

The zeta potential of the composite particles in the aqueous dispersion of composite particles after dialysis was measured, and consequently the zeta potential at a pH of 8.0 and at 25° C. was −81 mV.

The aqueous dispersion of composite particles (emulsion) in the polymerization process, which was sampled from the reactor after 18 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.5 and at 60° C. was −99 mV. The MFT of the dispersion was 39° C.

To the aqueous dispersion of composite particles was added 5% of Texanol CS-12 and testing was performed according to the warm water resistance test, and consequently the rating was "A".

Comparative Example 1

To a reactor having a reflux condenser, a drop tank, a thermometer and a stirring apparatus was loaded 327.9 g of Adelite (registered trademark) AT-50 (aqueous dispersion of silica particles (colloidal silica), produced by Adeka Corporation, pH: 10.2) in which the pH was adjusted to 7.5 and the concentration was adjusted to 49.0% by mass by dilute sulfuric acid, and the temperature was raised to 60° C. 30 g of an aqueous solution of AEROSOL (registered trademark) OT-75 (sodium dioctylsulfosuccinate (surfactant (a)), produced by CBC Co., Ltd.), in which the concentration was adjusted to 10% by mass, was slowly added thereto. The dispersion in the reactor was heated to 70° C. under a nitrogen atmosphere, and thereafter 50 g of sodium persulfate (2% aqueous solution) was added. After 5 minutes, a mixture of 34 g of methyl methacrylate, 65 g of butyl acrylate and 1.0 g of methacrylic acid, 6 g of Pelex SS-L (aqueous solution of surfactant (b), produced by Kao Corporation) in which the concentration was adjusted to 48% by mass, and 130 g of ion exchange water was allowed to feed in the reactor over 90 minutes, and the particle produced was aggregated before being allowed to feed therein.

Comparative Example 2

To a reactor having a reflux condenser, a drop tank, a thermometer and a stirring apparatus was loaded 333.3 g of Adelite (registered trademark) AT-50 (aqueous dispersion of silica particles (colloidal silica), produced by Adeka Corporation, pH: 10.2) in which the concentration was adjusted to 51.0% by mass, and the temperature was raised to 60° C. 30 g of an aqueous solution of Neopelex (registered trademark) G-15 (sodium dodecylbenzenesulfonate (surfactant (a)), produced by Kao Corporation), in which the concentration was adjusted to 10% by mass, was slowly added thereto. The dispersion in the reactor was heated to 70° C. under a nitrogen atmosphere, and thereafter 20 g of sodium persulfate (2% aqueous solution) was added. After 5 minutes, a mixture of 1.7 g of methyl methacrylate, 3.25 g of butyl acrylate and 0.05 g of methacrylic acid as monomers at the first stage, 0.3 g of Pelex SS-L (aqueous solution of surfactant (b), produced by Kao Corporation) in which the concentration was adjusted to 48% by mass, and 6.5 g of ion exchange water was loaded to the reactor, and held for 70 minutes. Subsequently, a mixture of 32.3 g of methyl methacrylate, 61.75 g of butyl acrylate and 0.95 g of methacrylic acid as monomers at the second state, 5.7 g of Pelex SS-L (aqueous solution of surfactant (b), produced by Kao Corporation), in which the concentration was adjusted to 48% by mass, 30 g of sodium persulfate (2% aqueous solution), and 123.5 g of ion exchange water was allowed to feed in the reactor over 90 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 48 nm, in which the pH was 8.9 and the solid content was 42.5% by mass. The zeta potential of the composite particles in the resulting dispersion at 60° C. was −45 mV.

The zeta potential of the composite particles in the aqueous dispersion of composite particles after dialysis was measured, and consequently the zeta potential at a pH of 7.5 and at 25° C. was −28 mV.

The aqueous dispersion of composite particles (emulsion) in the polymerization process, which was sampled from the reactor after 19 minutes of the initiation of the infeed of the mixture at the second stage, was transferred to a small vessel and held under purging with nitrogen at the polymerization temperature for 1 hour, thereafter the pH and the zeta potential were measured, and consequently the zeta potential at a pH of 8.7 and at 60° C. was −47 mV.

To the aqueous particle dispersion was added 5% of Texanol CS-12 and testing was performed according to the warm water resistance test, and consequently the rating was "C".

Comparative Example 3

To a reactor having a reflux condenser, a drop tank, a thermometer and a stirring apparatus was loaded 200 g of ion exchange water, and the temperature was raised to 60° C. Thereafter, 30 g of an aqueous solution of AEROSOL (registered trademark) OT-75 (sodium dioctylsulfosuccinate) (produced by CBC Co., Ltd.), in which the concentration was adjusted to 10% by mass, was slowly added. The solution in the reactor was heated to 75° C. under a nitrogen atmosphere, and thereafter 20 g of ammonium persulfate (2% aqueous solution) was added. After 5 minutes, a mixture of 162.5 g of methyl methacrylate, 78.75 g of butyl acrylate and 8.75 g of methacrylic acid, 6 g of Pelex (registered trademark) SS-L (produced by Kao Corporation) in which the concentration was adjusted to 48% by mass, 130 g of ion exchange water, and 30 g of ammonium persulfate (2% aqueous solution) was allowed to feed in the reactor over 90 minutes. After completion of the infeed, the dispersion in the reactor was further stirred at 80° C. for 90 minutes. Thereafter, the dispersion was cooled to room temperature and the pH was adjusted to 9.0 by an aqueous NaOH solution, and the resultant was then filtered by a 100-mesh metal screen to thereby provide an aqueous dispersion whose average particle size was 118 nm, in which the solid content was 38.5% by mass. The zeta potential of the resulting dispersion at 60° C. was −55 mV.

The zeta potential of the acrylic polymer particle in the aqueous dispersion after dialysis was measured, and consequently the zeta potential at a pH of 8.0 and at 25° C. was −21 mV.

The dispersion in the polymerization process, which was sampled from the reactor after 18 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 2.0 and at 60° C. was −35 mV.

Comparative Example 4

<Production Example in which Initiator was Changed to Oil-Soluble Initiator in Example 7>

To a reactor having a reflux condenser, a drop tank, a thermometer and a stirring apparatus was loaded 477.4 g of Cataloid (registered trademark) SI80P (aqueous dispersion of silica particles (colloidal silica), produced by Catalysts & Chemicals Industries Co., Ltd.) in which the pH was adjusted to 103 and the concentration was adjusted to 41.9% by mass by 12.0 g of an aqueous 1% by mass NaOH solution, and the temperature was raised to 60° C. Thereafter, 20 g of an aqueous solution of AEROSOL (registered trademark) OT-75 (sodium dioctylsulfosuccinate (surfactant (a)) (produced by CBC Co., Ltd.), in which the concentration was adjusted to 10% by mass, was slowly added. The amount of adsorption of AEROSOLOT-75 to Cataloid SI80P at 60° C. was 1.0% by mass. The dispersion in the reactor was heated to 70° C. under a nitrogen atmosphere. Thereafter, a mixture of 10 g of styrene, 58 g of methyl methacrylate, 130 g of butyl acrylate and 2.0 g of sodium p-styrenesulfonate, 10.0 g of α,α'-azobisisobutyronitrile, 10 g of an aqueous 15% solution of Neopelex (registered trademark) G-15 (sodium dodecylbenzenesulfonate (surfactant (b)), produced by Kao Corporation), and 214 g of ion exchange water was allowed to feed in the reactor over 60 minutes. The particle was aggregated during the infeed.

Comparative Example 5

<Production Example of Dispersion Including Particle Different from Example 6 in Terms of No Silica Layer>

To a reactor equipped with a stirrer, a reflux condenser, a drop tank and a thermometer was loaded 290 g of water and 10 g of an aqueous 20% Eleminol JS-2 (surfactant) solution. After the temperature in the reactor was raised to 80° C., 10 g of an aqueous 2% ammonium persulfate solution was added. After 5 minutes, an emulsified mixture including 106 g of methyl methacrylate, 90 g of 2-ethylhexyl acrylate and 4 g of methacrylic acid as monomers at the first state, 30 g of an aqueous 2% ammonium persulfate solution, and 96 g of water was allowed to feed from the drop tank over 80 minutes. The temperature in the reactor was kept at 80° C. during the infeed. After completion of the infeed, the temperature in the reactor was kept at 80° C. for 30 minutes. Next, an emulsified mixture including 70 g of methyl methacrylate, 20 g of 2-ethylhexyl acrylate and 10 g of methacrylic acid as monomers at the second stage, 5 g of an aqueous 20% Eleminol JS-2 (surfactant) solution, 15 g of an aqueous 2% ammonium persulfate solution, and 48 g of water was allowed to feed from the drop tank over 40 minutes. The temperature in the reactor was kept at 80° C. during the infeed. After completion of the infeed, the temperature in the reaction vessel was kept at 80° C. for 30 minutes. Next, an emulsified mixture including 154 g of methyl methacrylate, 46 g of 2-ethylhexyl acrylate and 4 g of methacrylic acid as monomers as the third stage, 10 g of an aqueous 20% Eleminol JS-2 (surfactant) solution, 30 g of an aqueous 2% ammonium persulfate solution, and 96 g of water was allowed to feed from the drop tank over 80 minutes. The temperature in the reactor was kept at 80° C. during the infeed. After completion of the infeed, the temperature in the reactor was kept at 80° C. for 120 minutes. From the above operations, an acrylic emulsion including an acrylic polymer particle and water was obtained. The pH of the acrylic emulsion after cooling to room temperature was 2.0.

The emulsion was filtered by a 100-mesh metal screen. The dry weight of an aggregate separated by filtration was 0.02% relative to the total of the monomers, and was very slight. The solid content of the resulting acrylic emulsion was 44.0% by mass, and a single distribution was exhibited at a particle size of 100 nm.

<Synthesis of Aqueous Particle Dispersion>

In the reactor was taken 340.9 g of the acrylic emulsion, 50 g of water was added under stirring at room temperature, an aqueous 4% NaOH solution was added to adjust the pH to 10.0, and the temperature was raised to 60° C. Twenty g of Eleminol (registered trademark) JS-2 (surfactant (a)) in which the concentration was adjusted to 10% by mass was slowly added thereto, while the temperature was maintained at 60° C. The dispersion in the reactor was heated to 70° C. under a nitrogen atmosphere, and thereafter 20 g of sodium persulfate (2% aqueous solution) was added. After 5 minutes, a mixture of 17 g of methyl methacrylate, 32.5 g of butyl acrylate and 0.5 g of 2-(methacryloyloxy)ethyl phosphate, 6 g of Pelex (registered trademark) SS-L (surfactant (b)) in which the concentration was adjusted to 48% by mass, and 50 g of ion exchange water was allowed to feed in the reactor over 90 minutes. The particle was aggregated during the infeed.

Comparative Example 6

<Example Different from Example 2 in that Colloidal Silica was Changed to Acidic Colloidal Silica>

To a reactor having a reflux condenser, a drop tank, a thermometer and a stirring apparatus was loaded 419.8 g of Snowtex (registered trademark) ST-O40 (aqueous dispersion of silica particles (colloidal silica), produced by Nissan Chemical Industries. Ltd.) adjusted to 40.5% by mass, and the temperature was raised to 60° C. Forty g of an aqueous solution of Pelex (registered trademark) OT-P (sodium dioctylsulfosuccinate (surfactant (a)), produced by Kao Corporation), in which the concentration was adjusted to 10% by mass, was slowly added thereto. The dispersion in the reactor was heated to 70° C. under a nitrogen atmosphere, and thereafter 50 g of ammonium persulfate (2% aqueous solution) was added. After 5 minutes, a mixture of 85 g of methyl methacrylate, 164 g of butyl acrylate and 1.0 g of methacrylic acid, 30 g of an aqueous 15% solution of Neopelex G-15 (sodium dodecylbenzenesulfonate (surfactant (b)), produced by Kao Corporation), 20 g of an aqueous solution of AEROSOL (registered trademark) OT-75 (sodium dioctylsulfosuccinate (surfactant (a)), produced by CBC Co., Ltd.), in which the concentration was adjusted to 10% by mass, 10 g of ammonium persulfate (2% aqueous solution), and 150 g of ion exchange water was allowed to feed in the reactor over 180 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous particle dispersion whose average particle size was 116 nm, in which the pH was 2.1 and the solid content was 44.2% by mass. The pH of the resulting dispersion was adjusted to 8.5 by an aqueous NaOH solution, and the zeta potential at 60° C. measured was −45 mV.

The zeta potential of the composite particles in the aqueous particle dispersion after dialysis, in which the pH was adjusted, was measured, and consequently the zeta potential at a pH of 8.0 and at 25° C. was −34 mV.

To the aqueous particle dispersion in which the pH was adjusted was added 2% of Texanol CS-12 and testing was performed according to the warm water resistance test, and consequently the rating was "C".

Comparative Example 7

To a reactor having a reflux condenser, a drop tank, a thermometer and a stirring apparatus was loaded 200 g of ion exchange, and the temperature was raised to 60° C. Thereafter, 30 g of AEROSOL (registered trademark) OT-75 (sodium dioctylsulfosuccinate (produced by CBC Co., Ltd.) in which the concentration was adjusted to 10% by mass was slowly added. The solution in the reactor was heated to 75° C. under a nitrogen atmosphere, and thereafter 20 g of ammonium persulfate (2% aqueous solution) was added. After 5 minutes, a mixture of 99.5 g of methyl methacrylate, 81.75 g of butyl acrylate, 62.5 g of butyl methacrylate and 6.25 g of methacrylic acid, 6 g of Pelex (registered trademark) SS-L (produced by Kao Corporation) in which the concentration was adjusted to 48% by mass, 130 g of ion exchange water, and 30 g of sodium persulfate (2% aqueous solution) was allowed to feed in the reactor over 90 minutes. After completion of the infeed, the dispersion in the reactor was further stirred at 80° C. for 90 minutes. Thereafter, the dispersion was cooled to room temperature and the pH was adjusted to 9.0 by an aqueous NaOH solution, and the resultant was then filtered by a 100-mesh metal screen to thereby provide an aqueous dispersion whose average particle size was 121 nm, in which the solid content was 38.6% by mass. The zeta potential of the resulting dispersion at 60° C. was −48 mV.

The zeta potential of the acrylic polymer particle in the aqueous dispersion after dialysis was measured, and consequently the zeta potential at a pH of 8.0 and at 25° C. was −23 mV.

The dispersion in the polymerization process, which was sampled from the reactor after 18 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 2.0 and at 60° C. was −39 mV.

Furthermore, 100 g of this aqueous dispersion and 51.8 g of Snowtex (registered trademark) ST-50 (aqueous dispersion of silica particles (colloidal silica), produced by Nissan Chemical Industries. Ltd.) in which the pH was adjusted to 10.0 and the concentration was adjusted to 50.5% by mass by an aqueous sodium hydroxide solution were mixed. The MFT of the dispersion after mixing was 36° C. To the dispersion was added 5% of Texanol CS-12 and testing was performed according to the warm water resistance test, and consequently the rating was "C".

Comparative Example 8

<Example Different from Example 10 in that Ionic Ethylenic Monomer was not Used>

To a reactor having a reflux condenser, a drop tank, a thermometer and a stirring apparatus was loaded 354.2 g of Snowtex (registered trademark) ST-50 (aqueous dispersion of silica particles (colloidal silica), produced by Nissan Chemical Industries. Ltd.) in which the pH was adjusted to 10.0 and the concentration was adjusted to 50.5% by mass by an aqueous sodium hydroxide solution, and the temperature was raised to 60° C. Thereafter, 40 g of Pelex (registered trademark) OT-P (sodium dioctylsulfosuccinate (surfactant (a)), produced by Kao Corporation) in which the concentration was adjusted to 10% by mass was slowly added. The amount of adsorption of Pelex OT-P to Snowtex ST-50 at 60° C. was 3.0% by mass. The dispersion in the reactor was heated to 70° C. under a nitrogen atmosphere, and thereafter 15 g of ammonium persulfate (2% aqueous solution) was added. After 5 minutes, a mixture of 105.75 g of methyl methacrylate, 81.75 g of butyl acrylate and 62.5 g of butyl methacrylate, 30 g of an aqueous 15% solution of Neopelex G-15 (sodium dodecylbenzenesulfonate (surfactant (b)), produced by Kao Corporation), 20 g of an aqueous solution of AEROSOL (registered trademark) OT-75 (sodium dioctylsulfosuccinate (surfactant (a)), produced by CBC Co., Ltd.), in which the concentration was adjusted to 10% by mass, 10 g of ammonium persulfate (2% aqueous solution), and 150 g of ion exchange water was allowed to feed in the reactor over 180 minutes. The particle was aggregated during the infeed.

Comparative Example 9

<Example in which Ionic Ethylenic Monomer was More Used than in Example 10>

To a reactor having a reflux condenser, a drop tank, a thermometer and a stirring apparatus was loaded 354.2 g of Snowtex (registered trademark) ST-50 (aqueous dispersion of silica particles (colloidal silica), produced by Nissan Chemical Industries. Ltd.) in which the pH was adjusted to 10.0 and the concentration was adjusted to 50.5% by mass by an aqueous sodium hydroxide solution, and the temperature was raised to 60° C. Thereafter, 40 g of an aqueous solution of Pelex (registered trademark) OT-P (sodium dioctylsulfosuccinate (surfactant (a)), produced by Kao Corporation), in which the concentration was adjusted to 10% by mass, was slowly added. The amount of adsorption of Pelex OT-P to Snowtex ST-50 at 60° C. was 3.0% by mass. The dispersion in the reactor was heated to 70° C. under a nitrogen atmosphere, and thereafter 15 g of ammonium persulfate (2% aqueous solution) was added. After 5 minutes, a mixture of 93.25 g of methyl methacrylate, 81.75 g of butyl acrylate, 62.5 g of butyl methacrylate and 12.5 g of methacrylic acid, 30 g of an aqueous 15% solution of Neopelex G-15 (sodium dodecylbenzenesulfonate (surfactant (b)), produced by Kao Corporation), 20 g of an aqueous solution of AEROSOL (registered trademark) OT-75 (sodium dioctylsulfosuccinate (surfactant (a)), produced by CBC Co., Ltd.), in which the concentration was adjusted to 10% by mass, 10 g of ammonium persulfate (2% aqueous solution), and 150 g of ion exchange water was allowed to feedin the reactor over 180 minutes. After completion of the infeed, the dispersion in the reactor was further stirred at 70° C. for 90 minutes. Thereafter, the dispersion was cooled to room temperature and filtered by a 100-mesh metal screen to thereby provide an aqueous dispersion of composite particles including a composite particle whose average particle size was 49 nm, in which the pH was 8.1 and the solid content was 49.4% by mass. The zeta potential of the composite particles in the resulting dispersion at 60° C. was −55 mV. The MFT here was 34° C.

The zeta potential of the composite particles in the aqueous dispersion of composite particles after dialysis was measured, and consequently the zeta potential at a pH of 7.3 and at 25° C. was −54 mV.

The aqueous dispersion of composite particles in the polymerization process, which was sampled from the reactor after 18 minutes of the initiation of the infeed of the above mixture including the monomers, was transferred to a small vessel and held under purging with nitrogen at the polymerization temperature for 1 hour, thereafter the pH and the zeta potential were measured, and consequently the zeta potential at a pH of 9.2 and at 60° C. was −58 mV.

To the aqueous dispersion was added 5% of Texanol CS-12 and testing was performed according to the warm water resistance test, and consequently the rating was "C.

INDUSTRIAL APPLICABILITY

The aqueous dispersion of composite particles according to the present invention can be utilized for a photonic crystal, paint/coating materials, a paper surface treatment agent, a paper processing agent, a fiber treatment agent, a pressure-sensitive adhesive, a conductive material, a thermoplastic composition, a fine structure, an optical material, an antireflection member and an optical lens.

The invention claimed is:
1. An aqueous dispersion of composite particles comprising:
    an aqueous medium including water; and
    composite particles dispersed in the aqueous medium, wherein
    the composite particles has a particle (A), and a polymer layer (B) encapsulating at least a part of a surface of the particle (A);
    the particle (A) is at least any one particle of an inorganic solid particle, or a silica-encapsulated particle having a core particle and a silica layer encapsulating at least a part of a surface of the core particle; and
    a zeta potential of the composite particles in the aqueous dispersion of composite particles at 60° C. is −70 mV to −160 mV at any pH in the range from 7 to 11.
2. The aqueous dispersion of composite particles according to claim 1, wherein
    the polymer layer (B) includes a polymer having an ionic monomer unit derived from an ionic ethylenically unsaturated monomer, and
    a content of the ionic monomer unit is 0.01 to 2.5% by mass based on a mass of the polymer.
3. The aqueous dispersion of composite particles according to claim 2,
    wherein the polymer in the polymer layer (B) further has a non-ionic monomer unit derived from a non-ionic ethylenically unsaturated monomer.
4. The aqueous dispersion of composite particles according to claim 1,
    wherein a zeta potential of the composite particle in the aqueous dispersion of composite particles at 25° C. after being dialyzed is −60 mV to −150 mV at any pH in the range from 7 to 11.
5. The aqueous dispersion of composite particles according to claim 1,
    wherein a mass ratio of the polymer layer (B)/the particle (A) is 0.01 to 10.

6. The aqueous dispersion of composite particles according to claim 1,
wherein
the zeta potential of the composite particles in the aqueous dispersion of composite particles at 60° C. is a value measured with respect to a dispersion for measurement obtained by diluting the aqueous dispersion of composite particles having a pH of 7 to 11 with an aqueous KCl solution; and
when the pH of the aqueous dispersion of composite particles is less than 7, the dispersion for measurement is prepared by adding an aqueous NaOH solution to thereby adjust the pH within the range from 7 to 11 and thereafter diluting the aqueous dispersion of composite particles with an aqueous KCl solution.

7. The aqueous dispersion of composite particles according to claim 4, wherein
the zeta potential of the composite particles in the aqueous dispersion of composite particles at 25° C. after dialysis is a value measured with respect to a dispersion for measurement obtained by dialyzing the aqueous dispersion of composite particles diluted with an aqueous 1 mM NaOH solution and diluting the aqueous dispersion of composite particles having a pH of 7 to 11 after being dialyzed with an aqueous KCl solution; and
when the pH of the aqueous dispersion of composite particles after being dialyzed is less than 7, the dispersion for measurement is prepared by adding an aqueous NaOH solution to thereby adjust the pH within the range from 7 to 11 and thereafter diluting the aqueous dispersion of composite particles with an aqueous KCl solution.

8. The aqueous dispersion of composite particles according to claim 1, further comprising two or more surfactants including a surfactant (a) and a surfactant (b).

9. The aqueous dispersion of composite particles according to claim 8,
wherein the surfactant (a) includes a multi-chain hydrophilic group type compound having two or more hydrophobic groups and at least one hydrophilic group.

10. The aqueous dispersion of composite particles according to claim 8,
wherein the surfactant (b) includes at least one compound selected from the group consisting of an alkylsulfonate salt, an alkenylsulfonate salt, an alkylarylsulfonate salt, an alkenylarylsulfonate salt, an isethionate salt type alkyl fatty acid ester, an isethionate salt type alkenyl fatty acid ester, an alkyl diphenyl ether disulfonate salt, an alkyl sulfate salt, an alkenyl sulfate salt, an alkylaryl sulfate salt and an ethoxylated alkylphenol sulfate salt.

11. A method of producing the aqueous dispersion of composite particle according to claim 2, comprising:
a step of polymerizing a monomer including the ionic ethylenically unsaturated monomer in a dispersion including water, the particle (A) and a surfactant, to thereby form the polymer layer (B) encapsulating at least a part of a surface of the particle (A).

12. The method according to claim 11, wherein
the surfactant includes a surfactant (a) and a surfactant (b); and the step of forming the polymer layer (B) includes:
preparing a dispersion including water, the particle (A) and the surfactant (a); and
polymerizing the monomer after simultaneous or separate addition of the monomer and the surfactant (b) to the dispersion prepared, or with addition of the monomer and the surfactant (b) to the dispersion prepared.

13. The method according to claim 12,
wherein the surfactant (a) includes a multi-chain hydrophilic group type compound having two or more hydrophobic groups and at least one hydrophilic group.

14. The method according to claim 12,
wherein the surfactant (b) includes at least one compound selected from the group consisting of an alkylsulfonate salt, an alkenylsulfonate salt, an alkylarylsulfonate salt, an alkenylarylsulfonate salt, an isethionate salt type alkyl fatty acid ester, an isethionate salt type alkenyl fatty acid ester, an alkyl diphenyl ether disulfonate salt, an alkyl sulfate salt, an alkenyl sulfate salt, an alkylaryl sulfate salt and an ethoxylated alkylphenol sulfate salt.

15. The method according to claim 12,
wherein
a content of the surfactant (a) in the dispersion is 0.05 to 25% by mass based on a total amount of 100% by mass of the monomer, and
an amount of the surfactant (b) to be added to the dispersion is 0.01 to 10% by mass based on a total amount of 100% by mass of the monomer.

16. The method according to claim 11,
wherein
the dispersion further includes a water-soluble initiator, the monomer is polymerized by emulsion polymerization, and
a content of the water-soluble initiator in the dispersion is 0.01 to 1.0% by mass based on a total amount of 100% by mass of the monomer.

17. The method according to claim 11,
wherein the dispersion further includes an oil-soluble initiator, the monomer is polymerized by emulsion polymerization or miniemulsion polymerization, and
a content of the oil-soluble initiator in the dispersion is 0.01 to 0.1% by mass based on a total amount of 100% by mass of the monomer.

18. The method according to claim 11,
wherein, while a mass ratio of the polymer layer (B)/the particle (A) is in the range from 0.01 to 0.5 in a process of polymerizing the monomer, the zeta potential of the composite particles in the dispersion at 60° C. is −70 mV to −160mV at any pH in the range from 7 to 11.

19. The method according to claim 11,
wherein, while a mass ratio of the polymer layer (B)/the particle (A) is in the range from 0.01 to 0.5 in a process of polymerizing the monomer, the polymer layer (B) includes 0.01 to 2.5% by mass of an ionic monomer unit derived from the ionic ethylenically unsaturated monomer based on a mass of 100% by mass of the polymer in the polymer layer (B).

* * * * *